United States Patent
Chang et al.

(10) Patent No.: US 9,223,342 B2
(45) Date of Patent: Dec. 29, 2015

(54) RADIO-FREQUENCY SYSTEM

(71) Applicant: Wistron NeWeb Corporation, Hsinchu (TW)

(72) Inventors: Chia-Hao Chang, Hsinchu (TW); Shau-Jiun Yu, Hsinchu (TW); Chih-Sen Hsieh, Hsinchu (TW); Chih-Ming Wang, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 13 days.

(21) Appl. No.: 14/333,494

(22) Filed: Jul. 16, 2014

(65) Prior Publication Data

US 2015/0133188 A1    May 14, 2015

(30) Foreign Application Priority Data

Nov. 8, 2013   (TW) .............................. 102140714 A

(51) Int. Cl.
*H04M 1/00* (2006.01)
*G06F 1/16* (2006.01)
*H01Q 1/22* (2006.01)

(52) U.S. Cl.
CPC .............. *G06F 1/1618* (2013.01); *G06F 1/162* (2013.01); *G06F 1/1698* (2013.01); *H01Q 1/2266* (2013.01)

(58) Field of Classification Search
CPC   H04W 88/02; H04M 1/72527; G06F 1/1633; G06F 1/1639; G06F 1/1649; G06F 3/0488
USPC .............. 455/90.3, 556.1, 557, 575.1, 575.3, 455/575.4, 575.7; 361/679.01, 679.02, 361/679.06–679.09, 679.15, 679.21, 361/679.06–679.08, 679.55; 713/1, 100
See application file for complete search history.

(56) References Cited

U.S. PATENT DOCUMENTS

| | | | | |
|---|---|---|---|---|
| 7,472,267 B2 * | 12/2008 | Park | ................... | G06F 1/162 713/1 |
| 8,199,476 B2 * | 6/2012 | Tian | ................... | G06F 1/1616 361/679.28 |
| 8,713,759 B2 * | 5/2014 | Cai | ................... | G06F 1/1681 361/679.27 |
| 9,143,369 B2 * | 9/2015 | He | ................... | H04L 25/03878 |
| 2013/0271378 A1 * | 10/2013 | Hulford | ................... | G06F 3/14 345/168 |
| 2014/0380227 A1 * | 12/2014 | Ng | ................... | G06F 1/1616 715/778 |
| 2015/0092323 A1 * | 4/2015 | Feng | ................... | G06F 1/1671 361/679.1 |

* cited by examiner

*Primary Examiner* — Quochien B Vuong
(74) *Attorney, Agent, or Firm* — Winston Hsu; Scott Margo

(57) ABSTRACT

A radio-frequency system for a wireless communication device is disclosed. The wireless communication device includes a first board body and a second board body, capable of operating in a pad mode. The radio-frequency system includes at least one antenna disposed in the first board body and extending along a first plane, and at least one metal wall electrically connected to a system ground, disposed on the second board body related to locations of the at least one antenna disposed in the first board body, extending along a second plane. When the wireless communication device operates in the pad mode, the second plane is substantially perpendicular to the first plane, such that each of the metal walls has a height in comparison to the first plane, and a projecting result of each of the metal walls corresponding to the first plane is adjacent to a radiating element of an antenna.

7 Claims, 32 Drawing Sheets

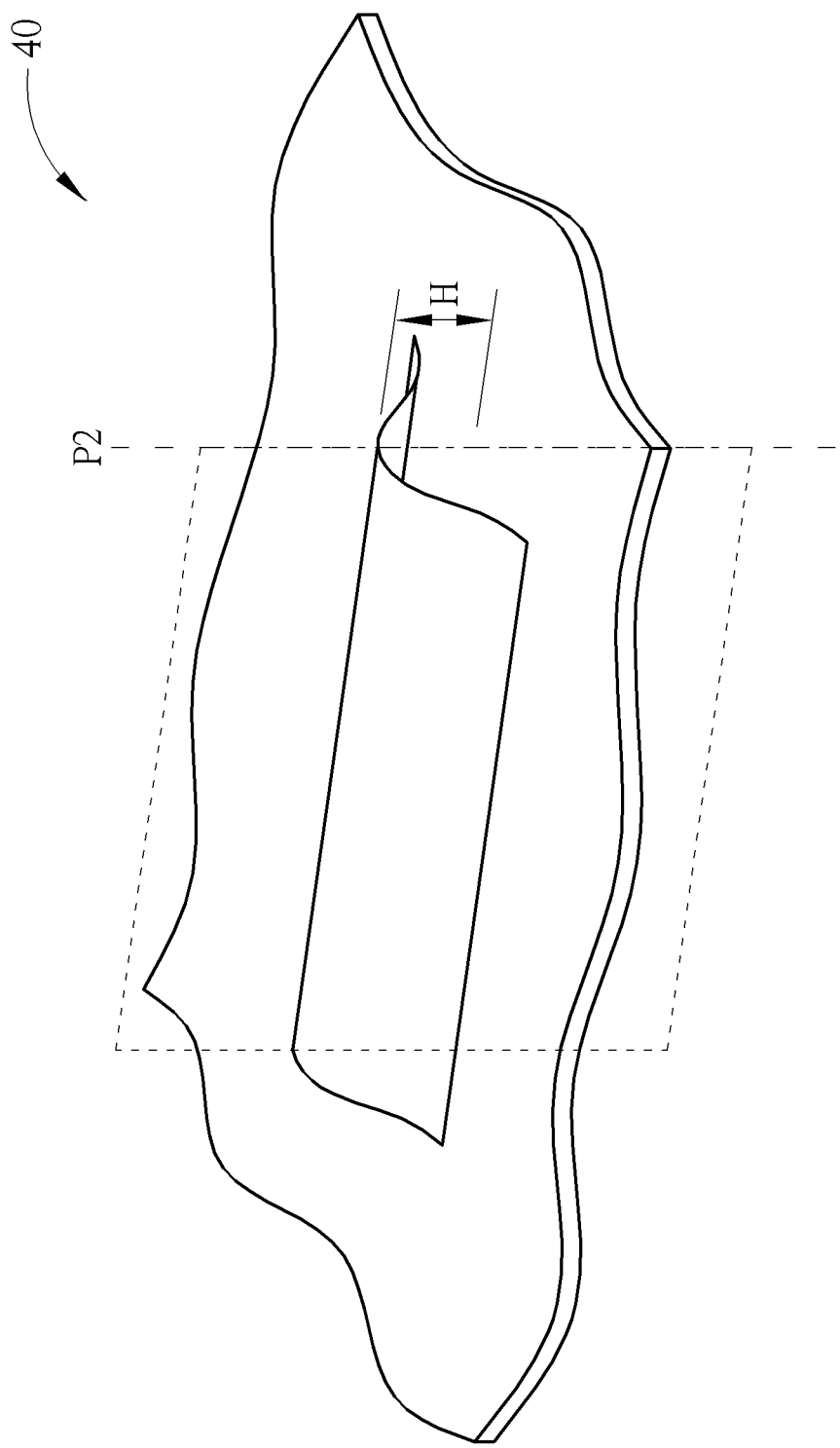

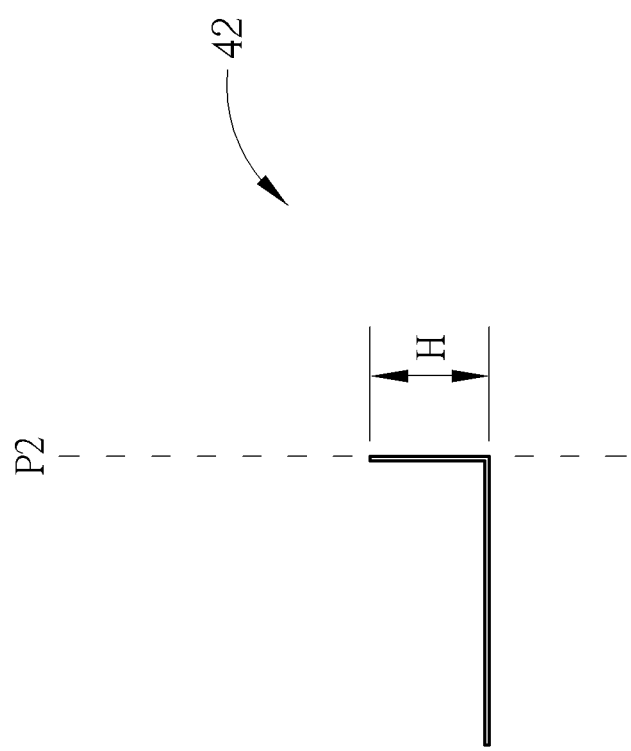

RADIO-FREQUENCY SYSTEM

BACKGROUND OF THE INVENTION

1. Field of the Invention

The present invention relates to a radio frequency (RF) system, and more particularly, to an RF system capable of maintaining good wireless communication functions in a pad mode and a non-pad mode.

2. Description of the Prior Art

Portable computer systems have characteristics such as small size, light weight, east to carry on, etc., allow users to have strong computational capability and document processing functions, and provide complete multimedia functions. Traditionally, a computer system comprises an up cover and a base. The up cover essentially comprises a monitor, and the base comprises a mainframe, a keyboard, a touch pad, etc. The up cover and the base are connected via a hinge, such that the up cover can be opened and closed in respect to the base, and such kind of computer system is also called laptop, or notebook. Nevertheless, as the touch screen technologies develop, the portable computer systems are no longer limited to be operated by keyboards or touch pads, as known as a notebook mode. A touch screen may further be disposed on an up cover of a portable computer system, such that the portable computer system may switch operation to a pad mode, meaning that the up cover and the base rotate via a hinge mechanism, and the up cover is attached to the base to exhibit a touch screen. Users may perform touching operations through the touch screen of the portable computer systems.

The design considerations for computer systems capable of switching operations to the notebook mode and the pad mode are not just the hinge mechanism which has to match the both modes; in addition, how to ensure that the portable computer systems perform normal operations in the both modes is more important. Take wireless communication functions as an example, if an antenna is disposed on (or around) a back of a monitor in the up cover, when operating in the pad mode, the monitor back is attached to the base, the antenna performance would be interfered or affected by the base. Therefore, how to keep the portable computer systems in normal operations in both the notebook mode and the pad mode is a significant objective in the field.

SUMMARY OF THE INVENTION

It is therefore a primary objective of the present invention to provide a RF system maintaining normal wireless communication functions in both the pad mode and the non-pad mode.

An embodiment of the present invention discloses a radio-frequency (RF) system for a wireless communication device, wherein the wireless communication device comprises a first board body and a second board body, and is capable of switching operations to a pad mode, in which an angle between the first broad body and the second broad body is less than a predefined value, or at least a non-pad mode, in which the angle is greater than the predefined value. The RF system comprises at least an antenna, disposed in the first board body and substantially extending along a first plane of the first board body, each of the antennas comprising a radiating element and a grounding element adjacent to the radiating element; and at least a metal wall, electrically connected to a system ground of the wireless communication device, disposed in locations of the second board body related to locations of the at least an antenna disposed in the first board body, and substantially extending along a second plane of the second board body; wherein when the wireless communication device operates in the pad mode, the second plane is substantially perpendicular to the first plane, such that each metal wall has a height corresponding to the first plane; wherein when the wireless communication device operates in the pad mode, a projection result of each of the metal walls corresponding to the first plane is substantially adjacent to the radiating element of one of the at least an antenna.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 4A, 4B are schematic diagrams of a front view and a side view of a metal wall according to an embodiment of the present invention.

FIGS. 4C, 4D are schematic diagrams of a front view and a side view of a metal wall according to an embodiment of the present invention.

DETAILED DESCRIPTION

Figure 1A:
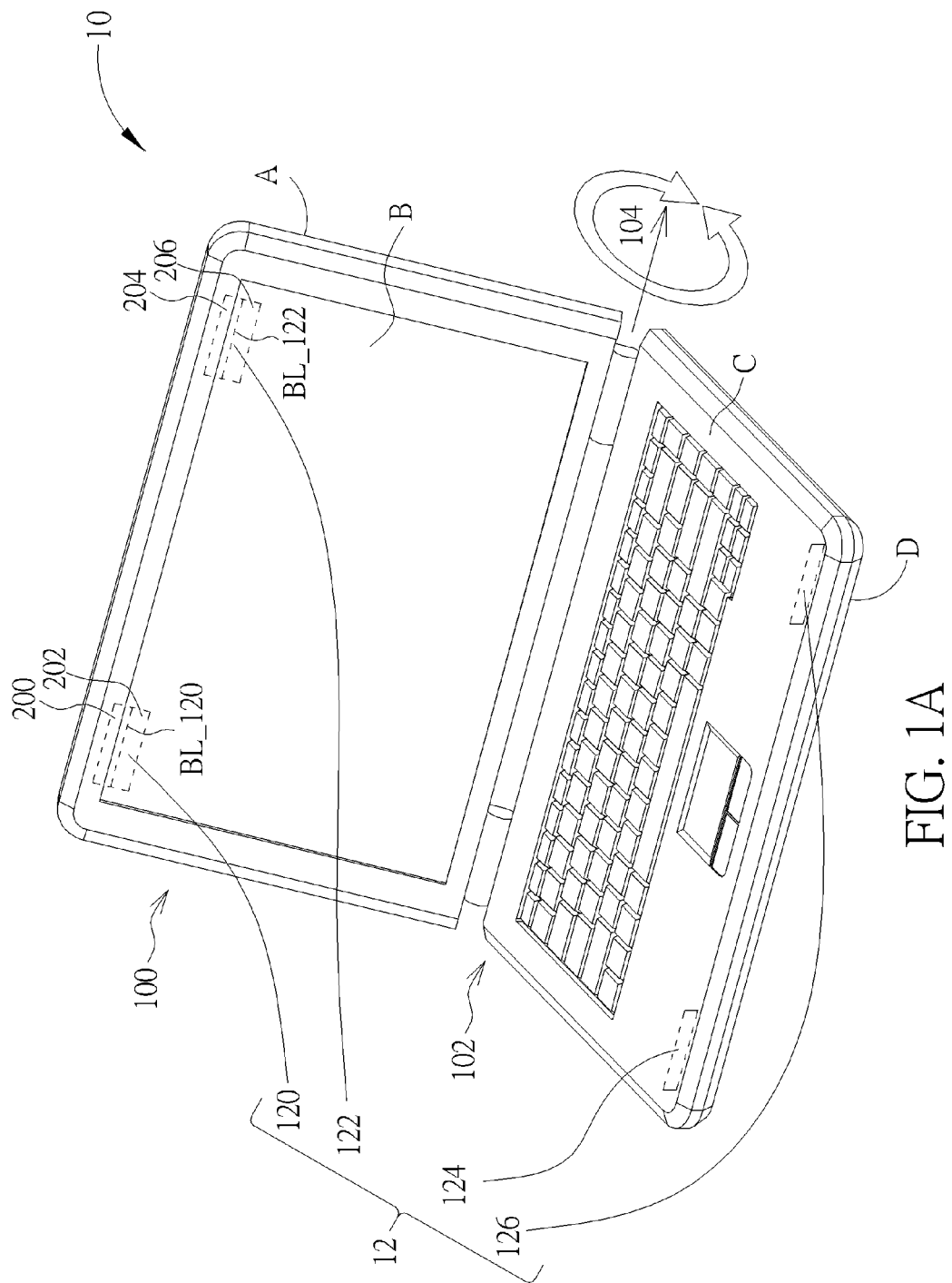
FIG. 1A is a diagram of a front view of a wireless communication device operating in the notebook mode according to an embodiment of the present invention.

Please refer to FIG. 1A. FIG. 1A is a schematic diagram of a front view a wireless communication device 10 according to an embodiment of the present invention. The wireless communication device 10 is a portable computer system, capable of operating in a pad mode and at least a non-pad mode, and comprises a first board body 100, a second board body 102 and a hinge 104. In the pad mode, the wireless communication device 10 exhibits a touch screen, and an angle between the first board body 100 and the second board body 102 is less than a predefined value, for providing users with an interface to perform touching operations on the wireless communication device 10 through the touch screen. In a non-pad mode, the angle between the first board body 100 and the second board body 102 is greater than the predefined value. The non-pad mode may be a notebook mode, a digital photo album mode, etc.

First of all, FIG. 1A shows the status of the wireless communication device 10 operating in the notebook mode. For the purpose of clear illustration, two opposite planes of the first board body 100 are defined as a plane A and a plane B, and two opposite planes of the second board body 102 are defined as a plane C and a plane D. The plane A of the first board body 100 has a back cover disposed. The plane B substantially comprises a monitor. The plane C of the second board body 102 comprises a keyboard and a touch pad. The plane D has a base board disposed. The hinge 104 is utilize for connecting the first board body 100 and the second board body 102, to allow the first board body 100 to rotate almost 360 degrees corresponding to the second board body 102, converting from the notebook mode shown in FIG. 1A to the pad mode in which the plane A and the plane D are attached to each other. Structures of a portable computer system are well known by those skilled in the art, and further details are omitted herein. In addition, the wireless communication device 10 is one of applications of the present invention, just for exemplifying the present invention, but not limited thereto.

Figure 1B:
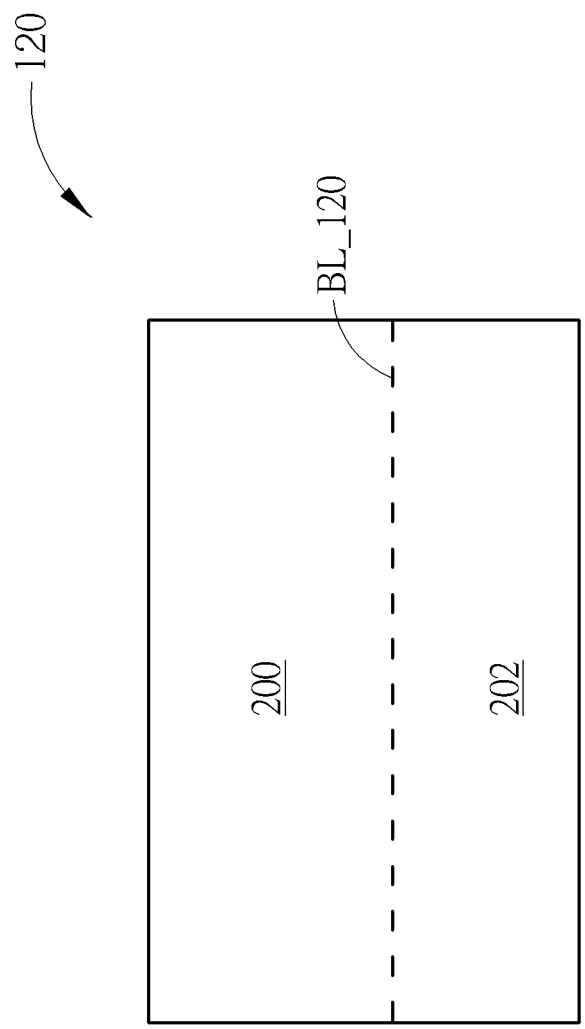
FIG. 1B is a schematic diagram of an antenna in FIG. 1A.

When the wireless communication device 10 switches operations to the pad mode, a radio-frequency (RF) system 12 of the wireless communication device 10 still ensures that the wireless communication device 10 can keep normal wireless communication functions. In detail, the RF system 12 comprises antennas 120, 122 and metal walls 124, 126. For brevity, the antennas 120, 122 are presented by two rectangles, which represent substantial ranges of the antennas 120, 122, instead of realistic antenna structures. In general, as shown in FIG. 1B, the antenna 120 substantially comprises a radiating element 200 and a grounding element 202, which are structurally distinguished. An adjacent line connecting the radiating element 200 and the grounding element 202 is denoted as a radiating element edge BL_120. Similarly, the structure of the antenna 122 follows the same rules. The antenna 122 substantially comprises a radiating element 204 and a grounding element 206, which are structurally distinguished. An adjacent line connecting the radiating element 204 and the grounding element 206 is denoted as a radiating element edge BL_122. Note that, the radiating elements 200, 204 represent rough areas for disposing radiating components, and the grounding elements 202, 206 represent rough areas for disposing grounding components. For brevity, the radiating elements 200, 204 and the grounding elements 202, 206 are all presented by rectangles. In fact, characteristics such as ranges, areas, lengths, widths and shapes of the radiating elements 200, 204 and the grounding elements 202, 206 can be modified adequately, but not limited thereto.

Figure 2A:
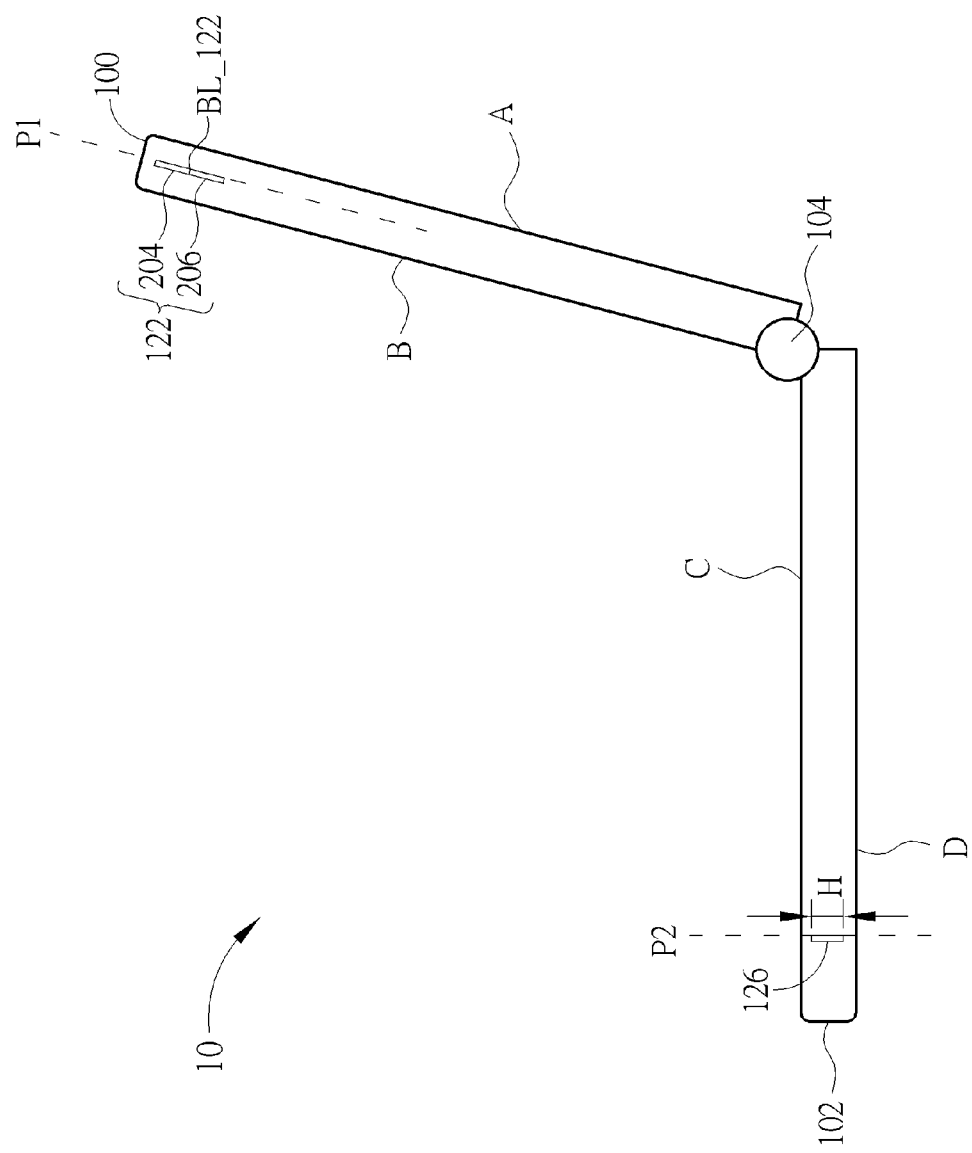
FIG. 2A is a schematic diagram of a sectional side view of the wireless communication device shown in FIG. 1A operating in the notebook mode.
Figure 2B:
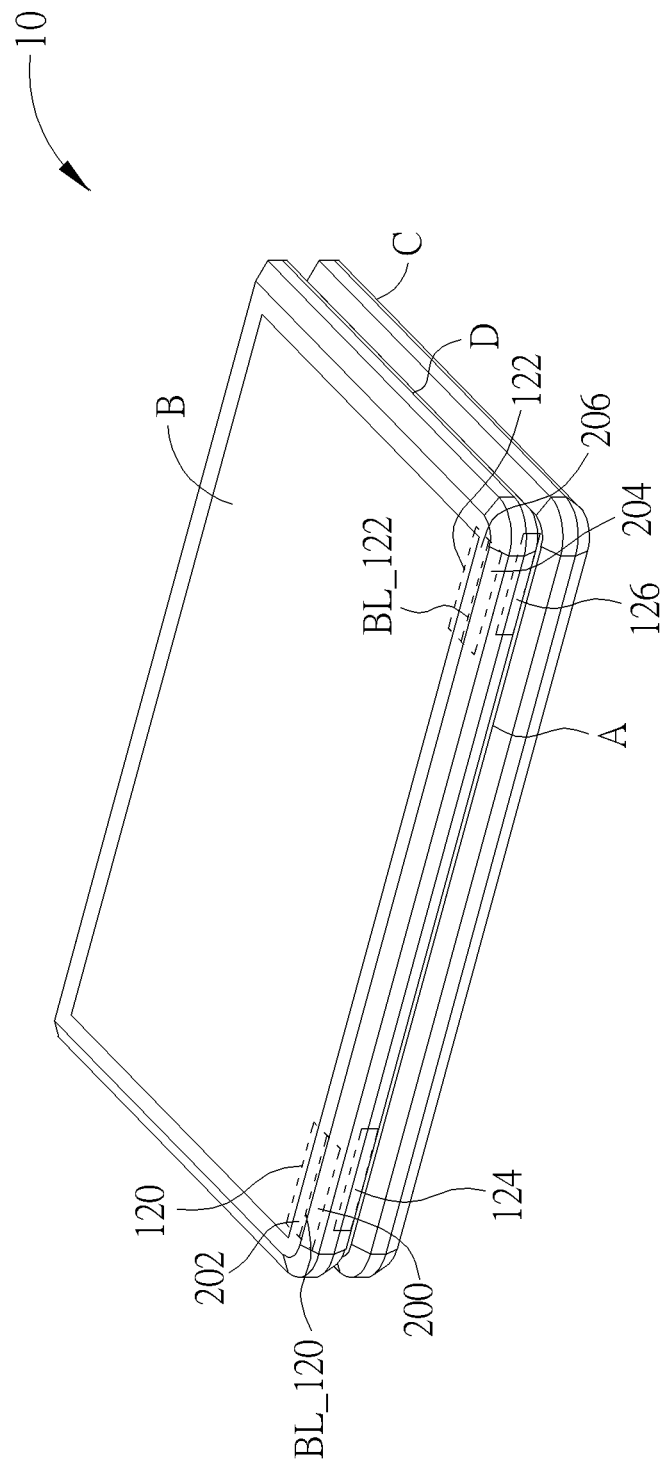
FIGS. 2B, 2C are schematic diagrams of a front view and a sectional side view of the wireless communication device shown in FIG. 1A operating in the pad mode.
Figure 2C:
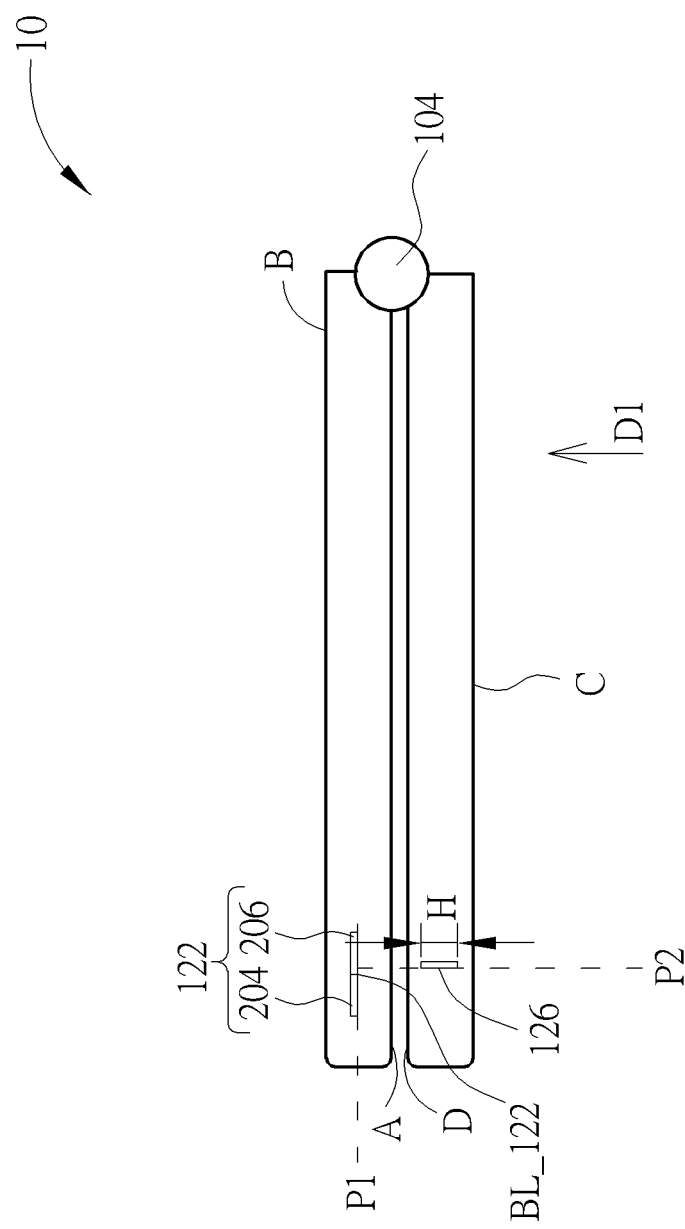
Figure 2D:
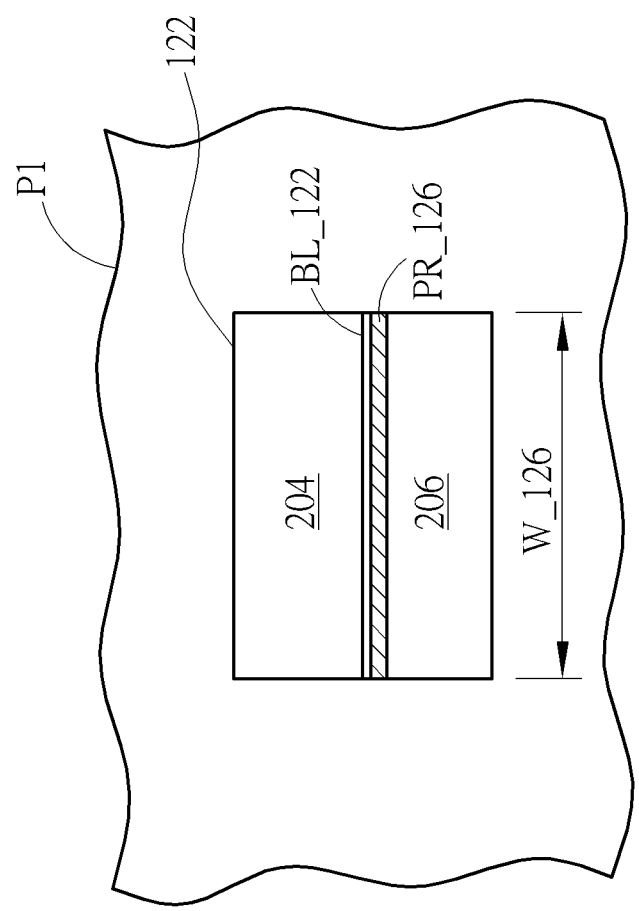
FIG. 2D is a schematic diagram of a projection result of FIG. 2C.
Figure 3A:
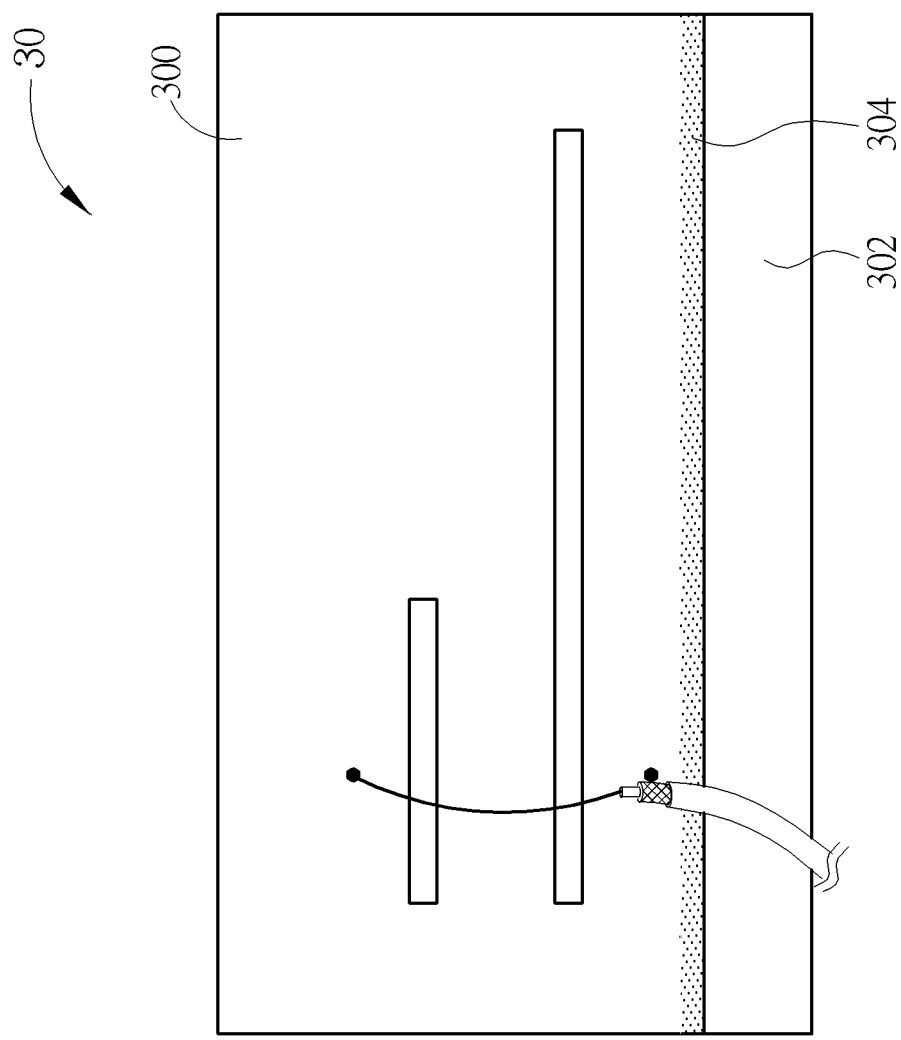
FIGS. 3A to 3D are schematic diagrams of antennas.
Figure 3B:
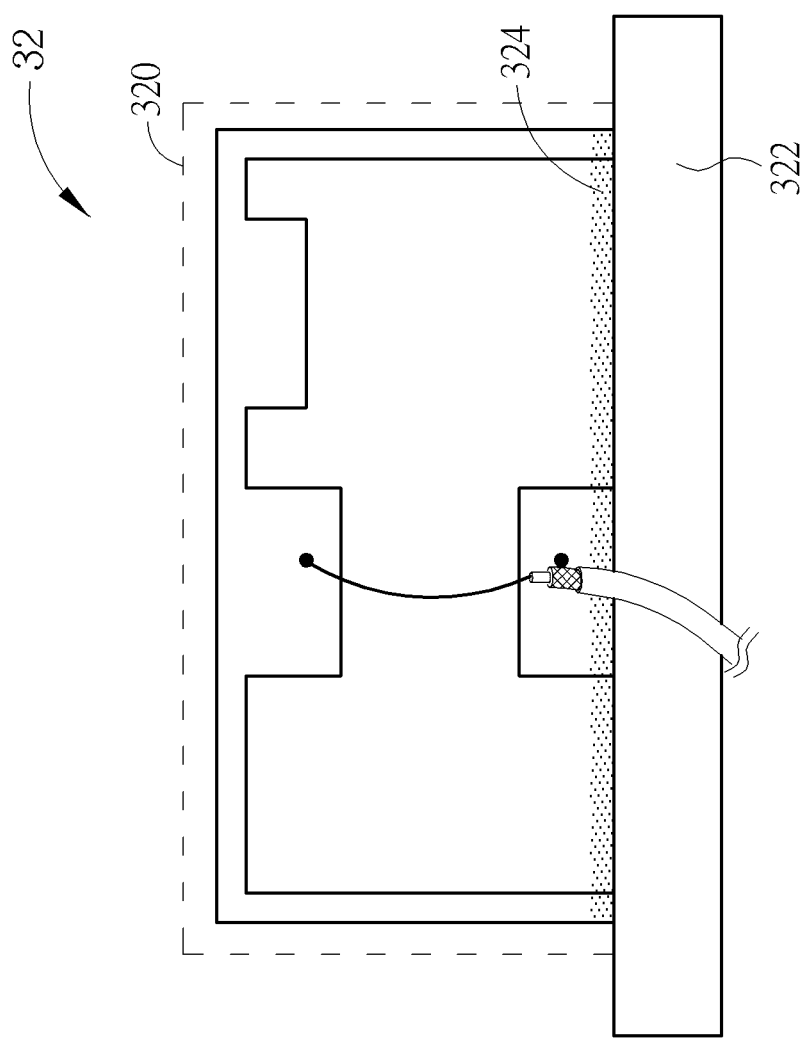
Figure 3C:
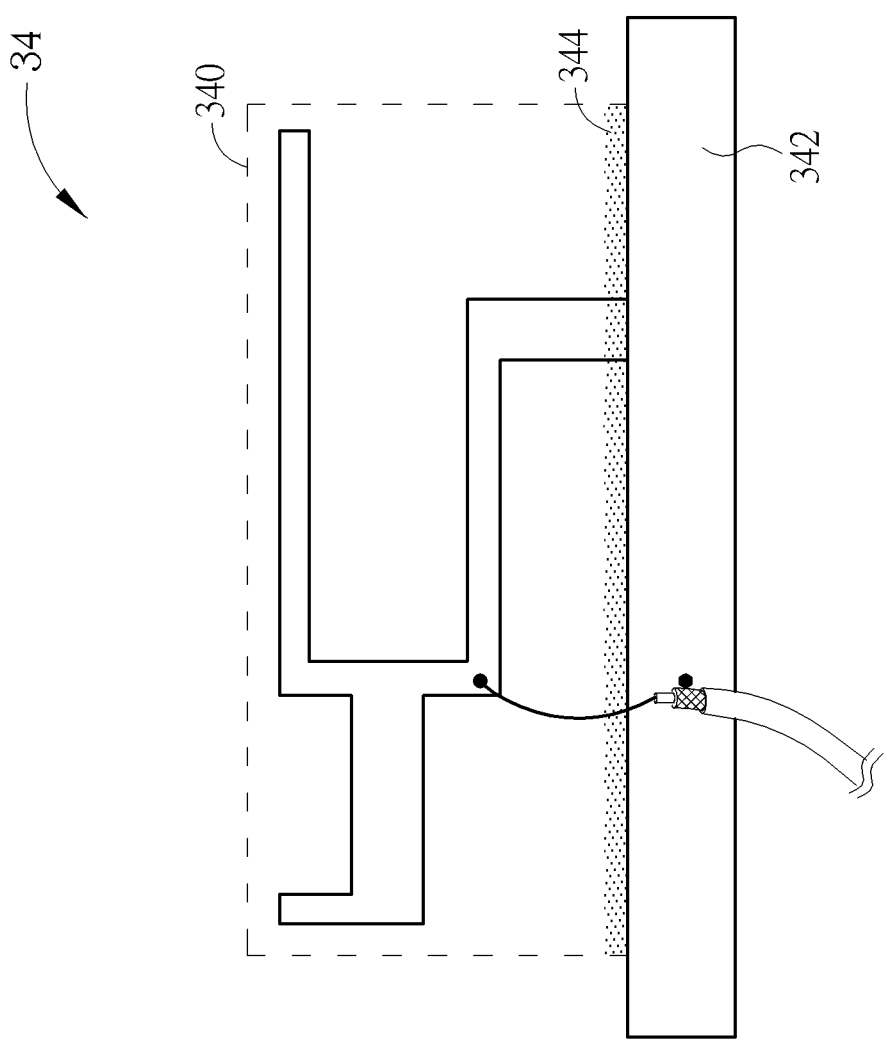
Figure 3D:
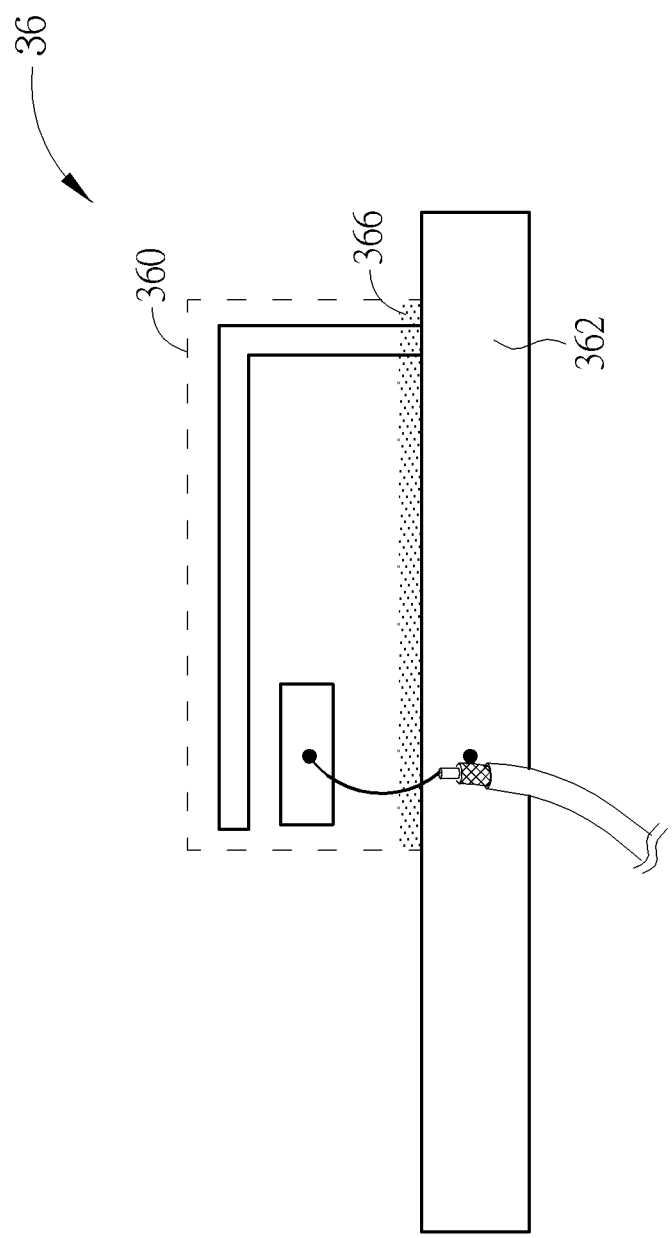

Please refer to FIGS. 2A to 2C, which show relationships between the antennas 120, 122 and the metal walls 124, 126. FIG. 2A is a schematic diagram of a sectional side view of the wireless communication device 10 operating in the notebook mode (as FIG. 1A). FIG. 2B is a schematic diagram of the wireless communication device 10 operating in the pad mode. FIG. 2C is a schematic diagram of a sectional side view of the wireless communication device 10 operating in the pad mode. As can be seen from FIGS. 2A to 2C, the antennas 120, 122 are disposed on the first board body 100 and substantially extend along a first plane P1 of the first board body 100. The metal walls 124, 126 are electrically connected to a system ground of the wireless communication device 10. The metal walls 124, 126 are disposed at locations in the second board body 102, which are related to locations for disposing the antennas 120, 122 in the first board body 100, and substantially extend along a second plane P2 of the second board body 102. More specifically, as shown in FIG. 2C, when the wireless communication device 10 operates in the pad mode, the plane A is attached to the plane D. The first plane P1 which the antennas 120, 122 are located on is substantially perpendicular to the second plane P2 which the metal walls 124, 126 are located on, such that the metal wall 126 (or 124) has a height H corresponding to the antenna 122 (or 120). Meanwhile, the metal wall 126 (or 124) is substantially under the grounding element 206 and close to the radiating element edge BL_122 (or BL_120) of the antenna 122 (or 120), having substantially the same width as the radiating element edge BL_122 (or BL_120). In other words, as shown in FIG. 2D, if the metal wall 126 is projected onto the first plane P1 (along with a direction D1 in FIG. 2C), a projection result PR_126 of the metal wall 126 partially overlaps with the grounding element 206, and approaches the radiating element edge BL_122 of the antenna 122, wherein a width W_126 of the projection result PR_126 is substantially the same as a width of the antenna 122. The metal walls 124, 126 avoid radiation energy of the antennas 120, 122 emitting toward the hinge 104, so as to prevent radiation efficiency of the antennas 120, 122 from being interfered by internal components of the second board body 102. Thus, when the wireless communication device 10 operates in the pad mode, the RF system 12 of the present invention maintains normal wireless communication functions.

Notably, the RF system 12 of the present invention maintains normal operations of wireless communication functions in both the pad mode and the non-pad mode. The terminology "the pad mode" is well known by those skilled in the art. In general, the pad mode is defined as the plane A being close to the plane D, and an included angle of the plane A and the plane D is less than a predefined value (e.g., 10 degrees), or a maximum distance between the plane A and the plane D is less than a predefined value (e.g., 3 cm). In any case, those skilled in the art should know that when the wireless communication device 10 operates in the pad mode, a user manipulates the touch screen on the plane B, so as to perform operations of the wireless communication device 10.

In addition, as described above, the rectangles of the antennas 120, 122 represent the rough ranges, instead of realistic antenna structures. The radiating element edges BL_120, BL_122 represent the substantial boundaries of the areas for disposing the radiating elements 200, 204, instead of realistic structural edges of the radiating elements. For example, please refer to FIGS. 3A to 3D, which are schematic diagrams of antennas 30, 32, 34, 36. The antennas 30, 32, 34, 36 comprise radiating elements 300, 320, 340, 360 and grounding elements 302, 322, 342, 362, and may implement the antennas 120, 122. The implementation method, as seen from FIGS. 1A, 1B and FIGS. 2A-2D, is to replace the antennas 120, 122 with the antennas 30, 32, 34, 36, and define borders 304, 324, 344, 364 between the radiating elements 300, 320, 340, 360 and the grounding elements 302, 322, 342, 362 as the radiating element edge BL_120 or BL_122. As can be seen from FIGS. 3A to 3D, the radiating elements 300, 320, 340, 360 represent the rough areas for disposing the radiating components, and the borders 304, 324, 344, 364 between the radiating elements 300, 320, 340, 360 and the grounding elements 302, 322, 342, 362 are the radiating element edges. Notably, the antennas 30, 32, 34, 36 are utilized for exemplifying a diversity of methods implementing the antennas 120, 122. Similar to the methods herein, those skilled in the art may make modifications and alternations for implementing the antennas 120, 122 according to different applications. For example, various slot antennas disclosed in U.S. patent application Ser. No. 13/745,857 by the applicant may be modified adequately and applied on the present invention.

Figure 4B:
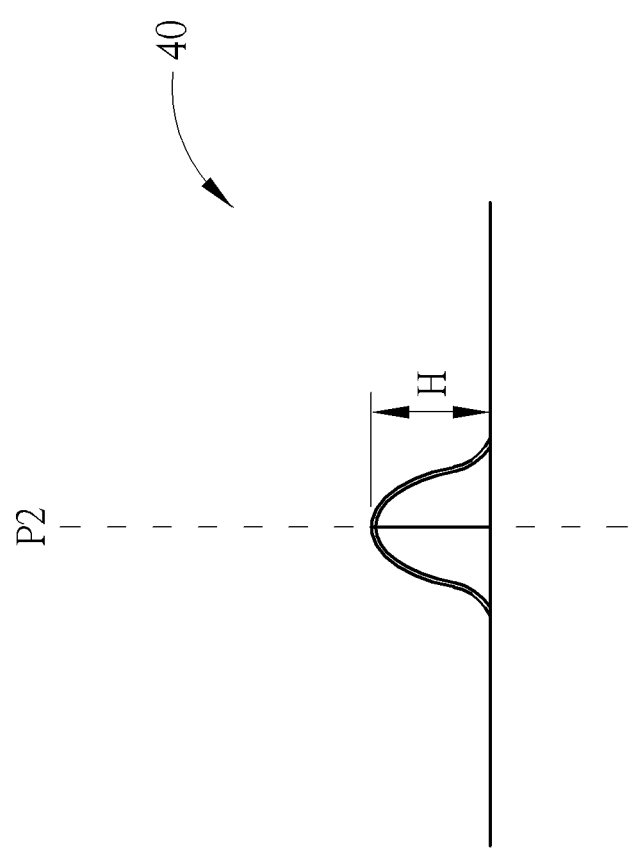
Figure 4C:
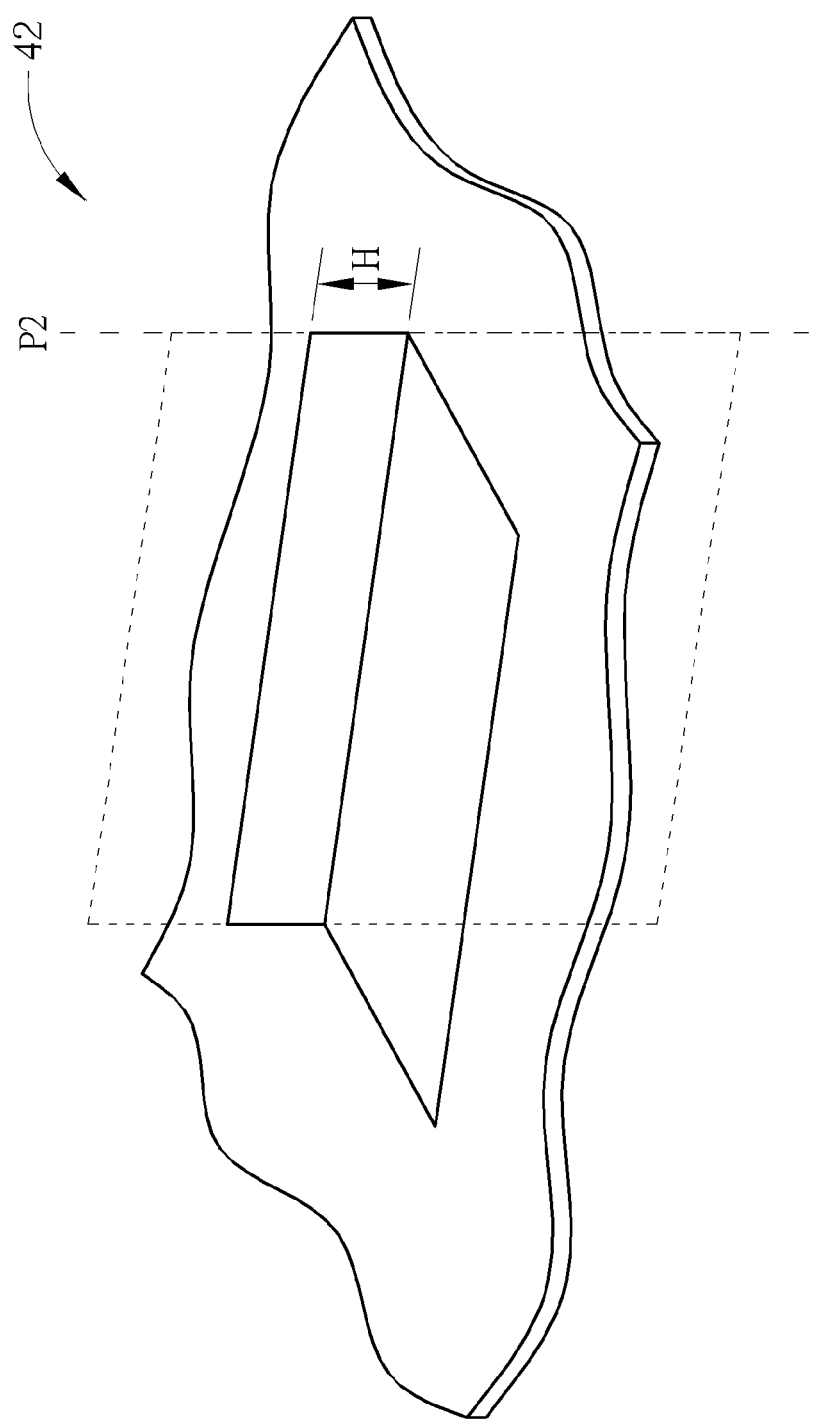

In addition, in the wireless communication device 10, the metal walls 124, 126 are implemented by metal rectangular sheets. In fact, implementation methods of the metal walls 124, 126 are not limited, as long as the metal walls 124, 126 have a height H on the second plane P2. For example, FIGS. 4A, 4B are schematic diagrams of a front view and a side view of a metal wall 40 according to an embodiment of the present invention. As shown in FIGS. 4A, 4B, the metal wall 40 has a rising structure like a peak, and has a height H on the second plane P2, which may also be utilized for implementing the metal walls 124, 126. Furthermore, FIGS. 4C, 4D are schematic diagrams of a front view and a side view of a metal wall 42 according to an embodiment of the present invention. As shown in FIGS. 4C, 4D, the metal wall 42 is similar to an L-type structure, and has the height H on the second plane P2, which may also be utilized for implementing the metal walls 124, 126. In addition to the peak structure shown in FIG. 4A and the L-type structure shown in FIG. 4C, other rising structures, e.g., triangles, trapezoids, semicircles, step-wise structure, may also be utilized for implementing the metal walls 124, 126. Moreover, the height H may be adjusted adequately according to required shielding effect, which can be greater than or equal to 1 mm, and may include variation in height according to system requirements. For example, in an embodiment, limited by disposable space, the height H may vary within 1 mm and 3 mm, still satisfying the requirements of the present invention.

Figure 4E:
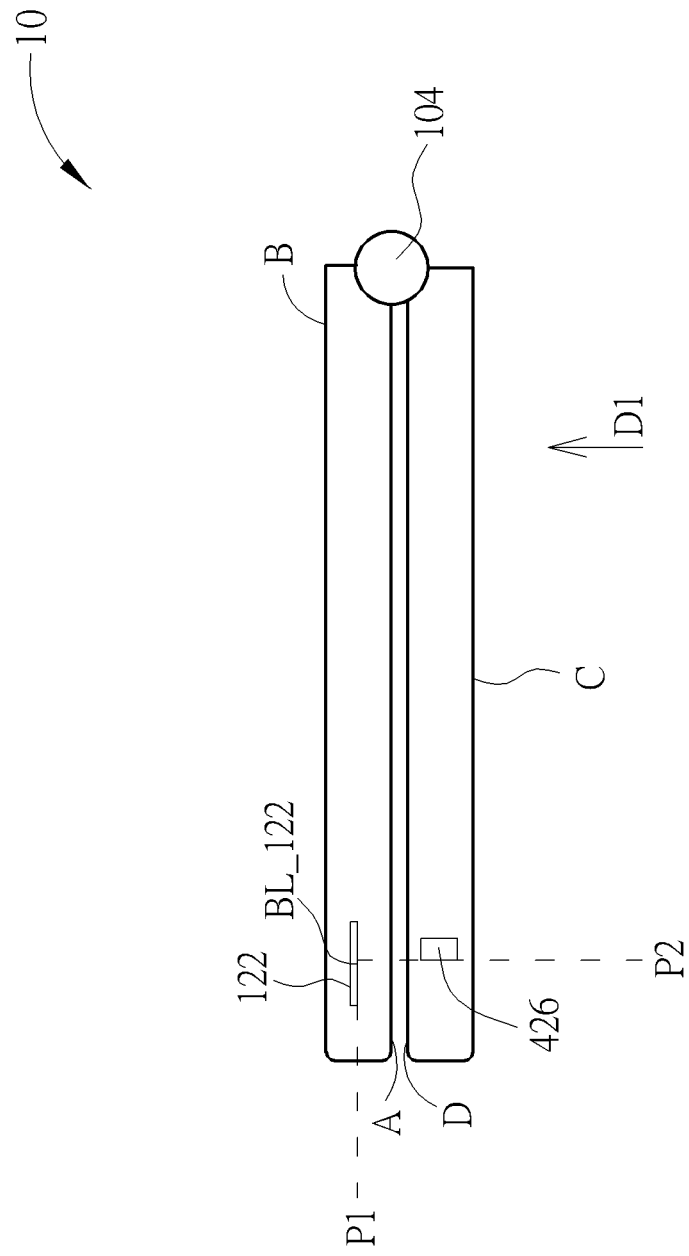
FIG. 4E is a schematic diagram of a metal wall applied on the wireless communication device shown in FIG. 2C according to an embodiment of the present invention.
Figure 4F:
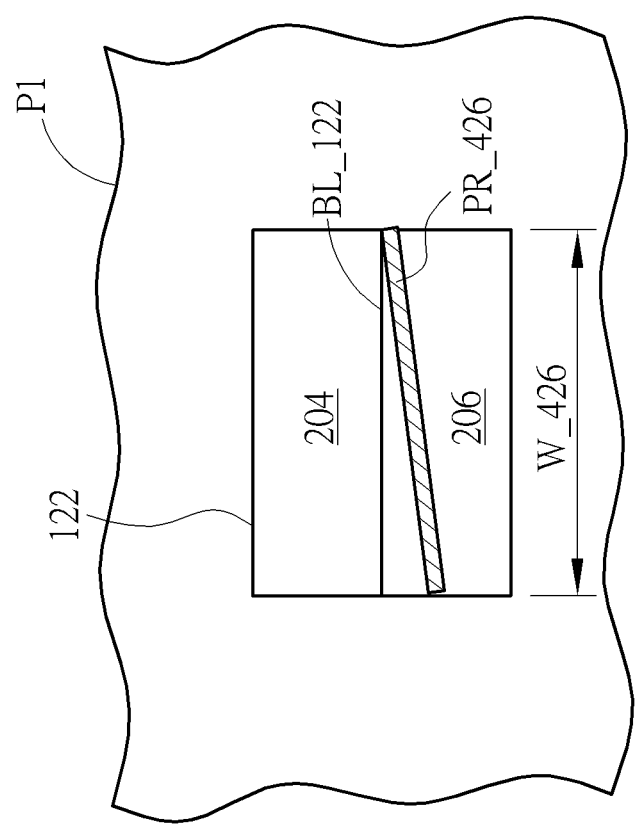
FIG. 4F is a schematic diagram of a projection result of FIG. 4E.

Furthermore, as shown in FIG. 2D, the width W_126 of the projection result PR_126 of the metal wall 126 is substantially the same as the width of the radiating element edge BL_122 of the antenna 122, but not limited thereto, as long as the widths of the projection results of the metal walls 124, 126 respectively greater than or equal to the widths the radiating element edges BL_120, BL_122, which satisfies the requirements of the present invention. For example, FIG. 4E is a schematic diagram of a sectional side view of a metal wall 426 applied on the wireless communication device 10 operating in the pad mode according to an embodiment of the present invention, and FIG. 4F is a schematic diagram of a projection result PR_426 of the metal wall 426 on the first plane P1 shown in FIG. 4D. As shown in FIGS. 4E and 4F, even the metal wall 426 is not parallel to the radiating element edge BL_122 of the antenna 122, a horizontal width of the projection result PR_426 has the same width as the radiating element edge BL_122, still satisfying the requirements of the present invention.

Figure 5A:
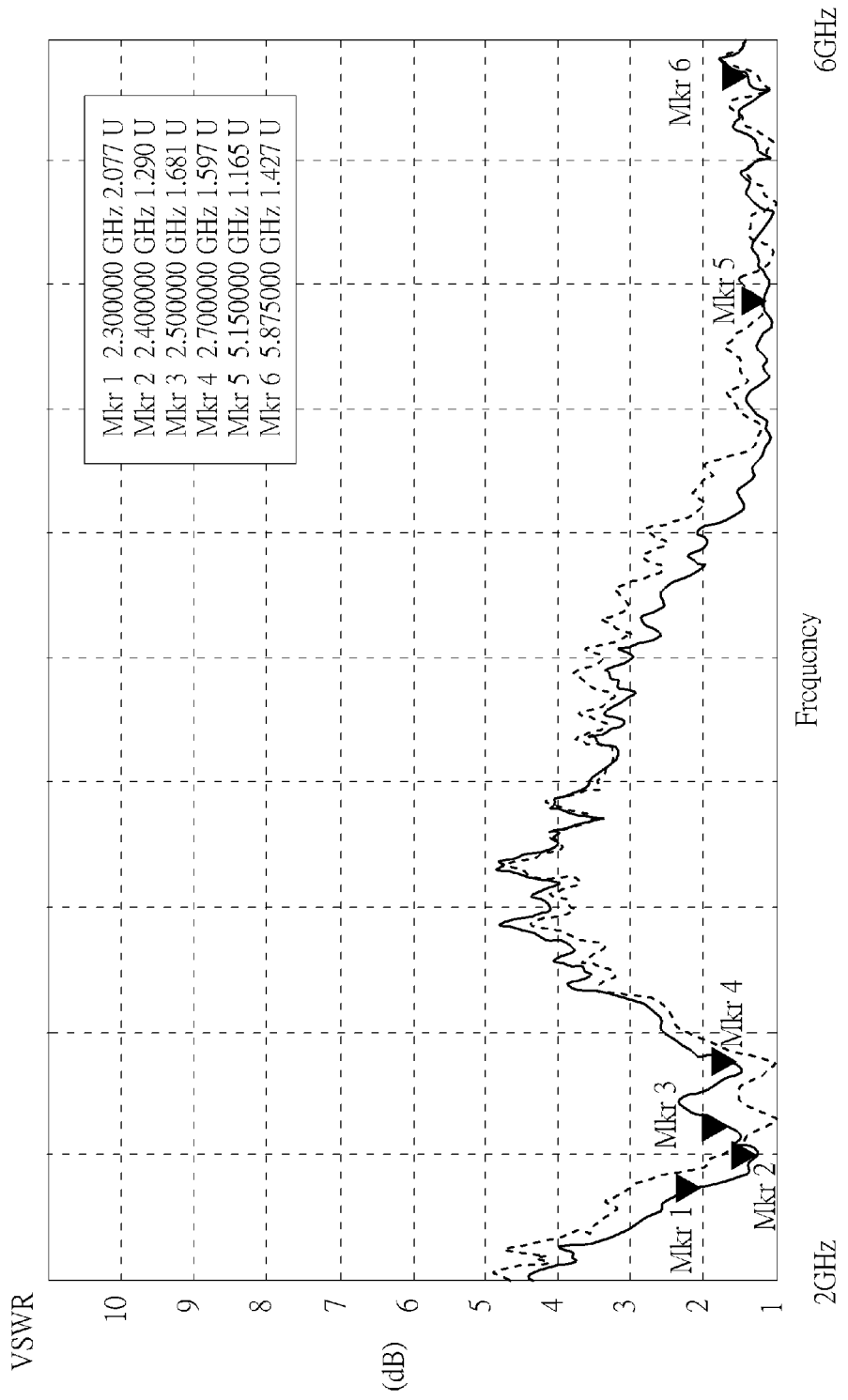
FIGS. 5A, 5B are schematic diagrams of voltage standing wave ratio (VSWR) of the wireless communication device shown in FIG. 1A after removing metal walls.
Figure 5B:
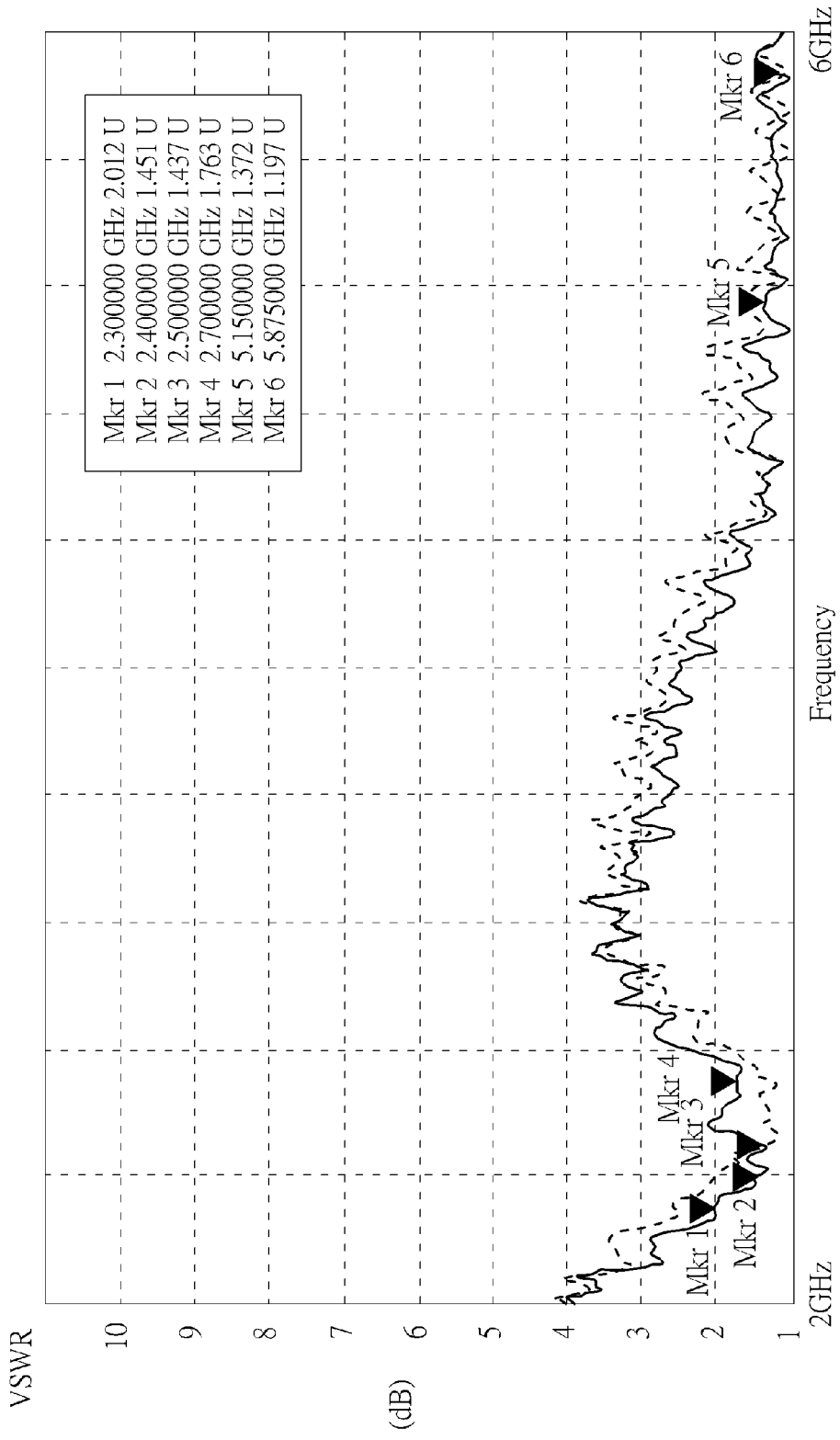
Figure 6A:
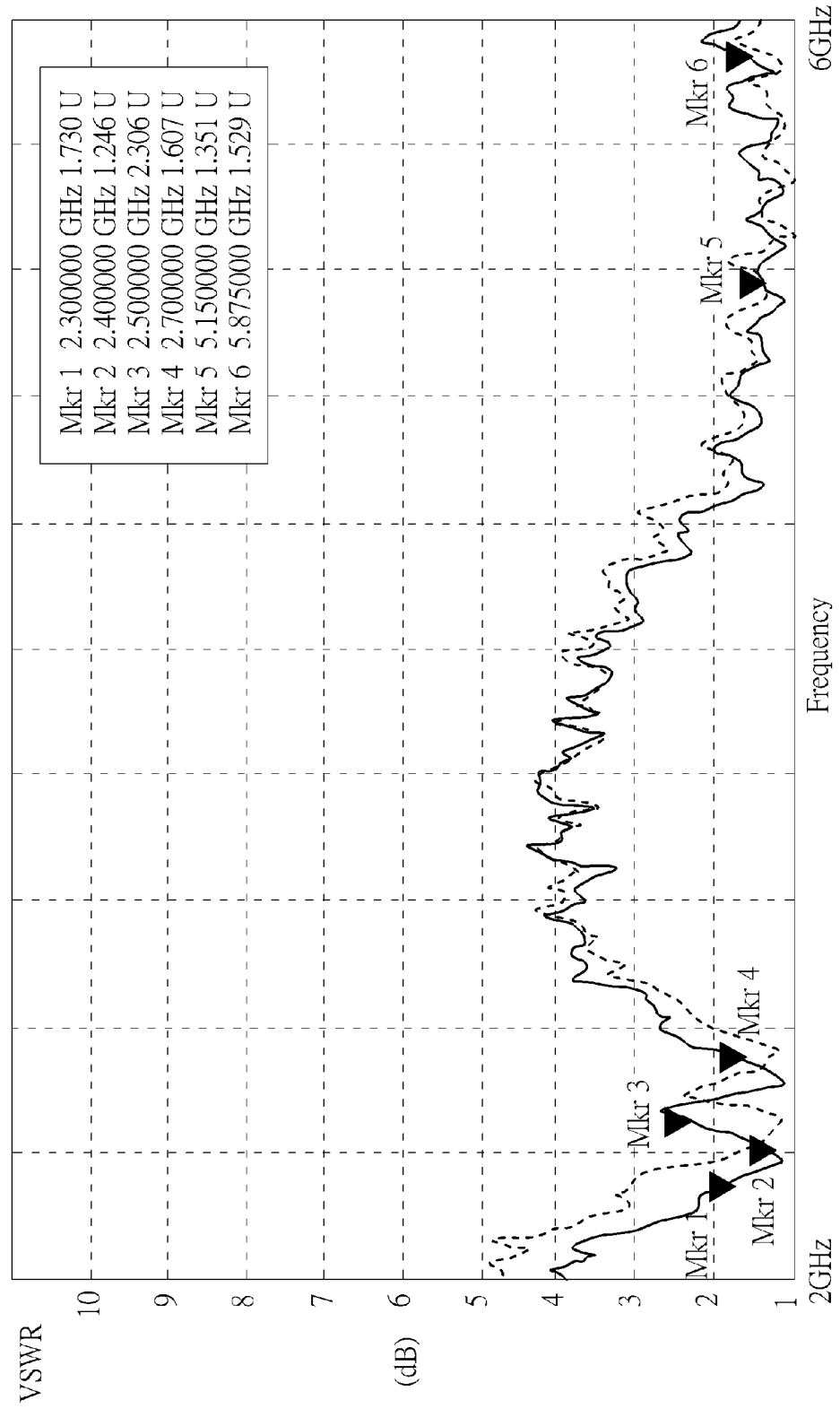
FIGS. 6A, 6B are schematic diagrams of VSWR of the wireless communication device shown in FIG. 1A after adding metal walls.
Figure 6B:
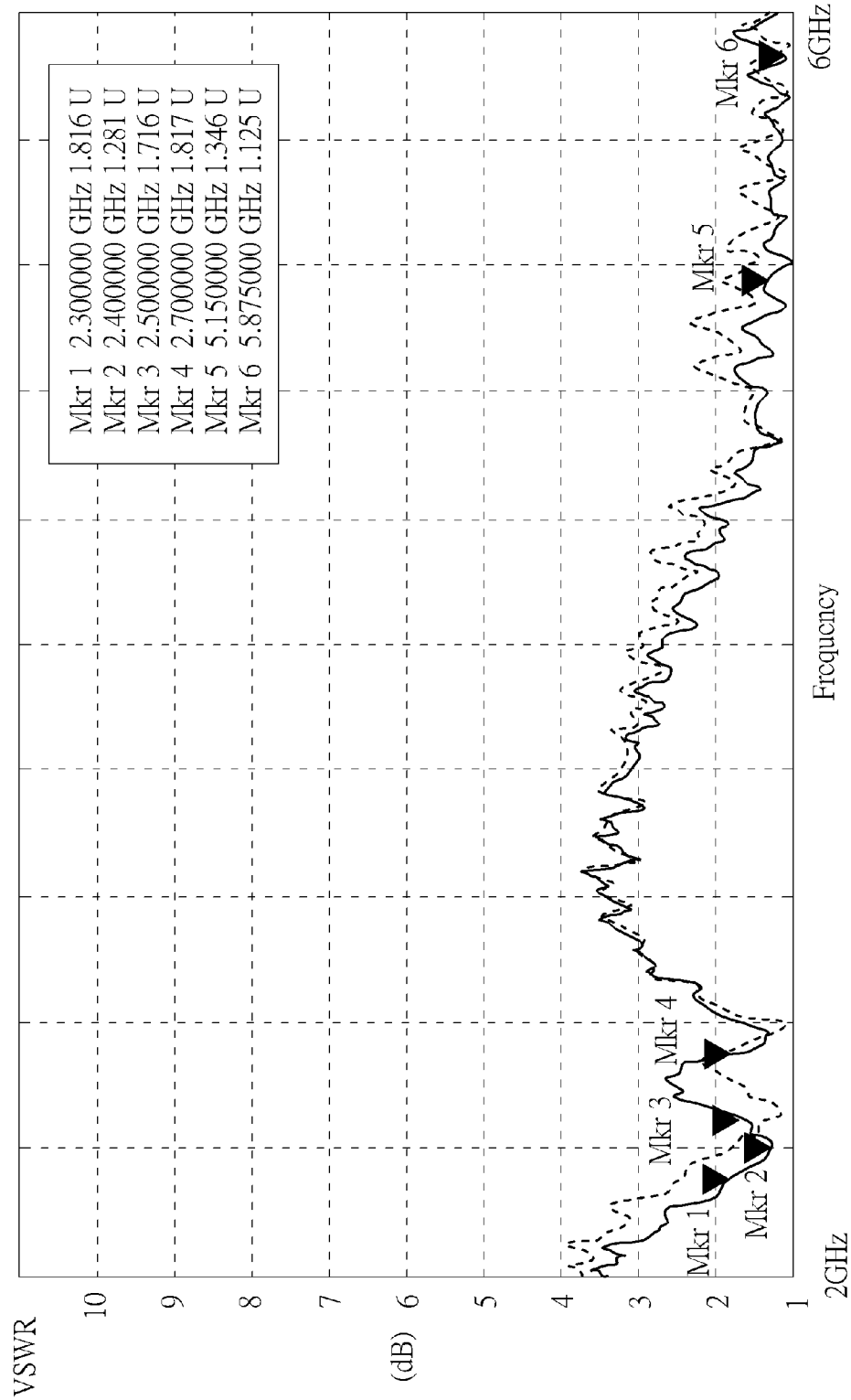

The performance improvement of wireless functions operating in the pad mode brought by the metal walls 124, 126 can be further referred to FIGS. 5A, 5B and FIGS. 6A, 6B. FIGS. 5A, 5B are schematic diagrams of voltage standing wave ratio (VSWR) of the antenna 120, 122 after removing the metal walls 124, 126. FIGS. 6A, 6B are schematic diagrams of VSWR of the antenna 120, 122 after adding the metal walls 124, 126. In FIGS. 5A, 5B and FIGS. 6A, 6B, solid lines represent VSWR in the notebook mode, and dash lines represent VSWR in the pad mode. In addition, TABLE I shows the antenna gains of the antennas 120, 122 in the notebook mode after removing the metal walls 124, 126; TABLE II shows the antenna gains of the antennas 120, 122 in the pad mode after removing the metal walls 124, 126; TABLE III shows the antenna gains of the antennas 120, 122 in the notebook mode after adding the metal walls 124, 126; TABLE IV shows the antenna gains of the antennas 120, 122 in the pad mode after adding the metal walls 124, 126.

TABLE I

| Frequency | Antenna Gain of the antenna 120 | Antenna Gain of the antenna 122 |
|---|---|---|
| 2400 | −3.42 | −4.27 |
| 2442 | −3.65 | −3.83 |
| 2484 | −3.75 | −4.00 |
| 5150 | −4.33 | −5.30 |
| 5350 | −4.56 | −4.93 |
| 5470 | −4.07 | −4.70 |
| 5725 | −4.36 | −4.68 |
| 5875 | −3.89 | −4.49 |

TABLE II

| Frequency | Antenna Gain of the antenna 120 | Antenna Gain of the antenna 122 |
|---|---|---|
| 2400 | −4.26 | −5.89 |
| 2442 | −4.48 | −4.94 |
| 2484 | −5.38 | −4.79 |
| 5150 | −6.54 | −7.01 |
| 5350 | −5.96 | −5.94 |
| 5470 | −5.71 | −6.22 |
| 5725 | −6.43 | −6.74 |
| 5875 | −6.56 | −6.72 |

TABLE III

| Frequency | Antenna Gain of the antenna 120 | Antenna Gain of the antenna 122 |
|---|---|---|
| 2400 | −3.87 | −3.33 |
| 2442 | −3.50 | −2.84 |
| 2484 | −3.42 | −3.96 |
| 5150 | −4.67 | −4.73 |
| 5350 | −4.34 | −4.43 |
| 5470 | −3.72 | −4.26 |
| 5725 | −3.66 | −4.89 |
| 5875 | −3.25 | −4.30 |

TABLE IV

| Frequency | Antenna Gain of the antenna 120 | Antenna Gain of the antenna 122 |
|---|---|---|
| 2400 | −4.28 | −3.39 |
| 2442 | −3.89 | −3.19 |
| 2484 | −3.57 | −4.27 |
| 5150 | −5.19 | −5.45 |

TABLE IV-continued

| Frequency | Antenna Gain of the antenna 120 | Antenna Gain of the antenna 122 |
|---|---|---|
| 5350 | −4.26 | −5.12 |
| 5470 | −4.19 | −5.11 |
| 5725 | −5.51 | −5.67 |
| 5875 | −5.23 | −5.19 |

Therefore, as can be seen from FIGS. 5A-6B and TABLEs I-IV, without the metal walls 124, 126, there are significant differences of the antenna efficiency and VWSR between operating in the pad mode and in the notebook mode, probably causing inefficiency signal transmission, or even affecting normal operations of wireless communication functions. In comparison to scenarios with the metal walls 124, 126, operating in the pad mode has more or less equivalent antenna properties as operating in the notebook mode, such that similar signal transmission efficiency is maintained, so as to ensure the normal operations of wireless communication functions.

As can be seen from the above, using the metal walls 124, 126, the RF system 12 ensures that the wireless communication device 10 maintains normal wireless communication functions in both the notebook mode the pad mode. Notably, the aforementioned embodiments are for illustrating the concept of the present invention, and any modifications made accordingly are under the scope of the present invention. For example, in FIG. 2C, the first plane P1 and the second plane P2 are substantially perpendicular to each other, which is one of the feasible embodiments. In reality, the first plane P1 and the second plane P2 represent main planes for disposing the antennas 120, 122 and the metal walls 124, 126, and may be properly adjusted as long as the metal walls 124, 126 corresponding to the disposed plane of the antennas 120, 122 have the height H in the pad mode. In addition, in the aforementioned embodiments, the antennas 120, 122 are disposed on the same plane (P1), but not limited thereto. The antennas 120, 122 may be disposed on different planes, as long as locations of the metal walls 124, 126 are substantially close to the radiating element edges BL_120, BL_122 of the antennas 120, 122 in the pad mode. Furthermore, in the wireless communication device 10, since the RF system 12 is a dual-antenna system, the two metal walls 124, 126 are required for the two antennas 120, 122. However, in an embodiment, if the RF system 12 comprises only one antenna, one metal wall is sufficient.

In addition, in the aforementioned embodiments, the hinge 104 of the wireless communication device 10 only rotates the first board body 100 and the second board body 102 along a single axis such that the wireless communication device 10 operates in the pad mode. However, the present invention maybe adequately modified and applied on other wireless communication devices.

Figure 7A:
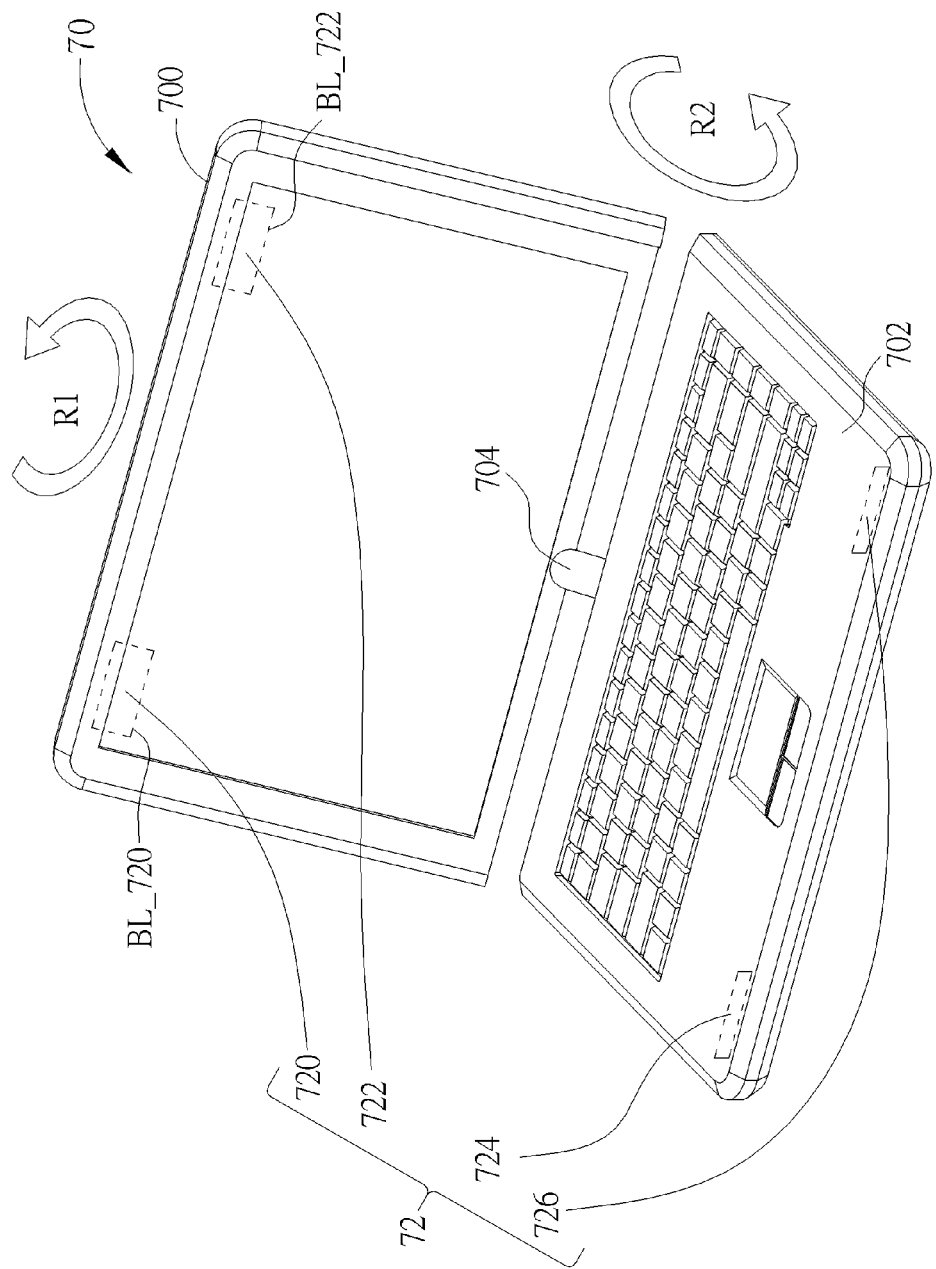
FIGS. 7A and 7B are schematic diagrams of a wireless communication device operating in the notebook mode and the pad mode according to an embodiment of the present invention.
Figure 7B:
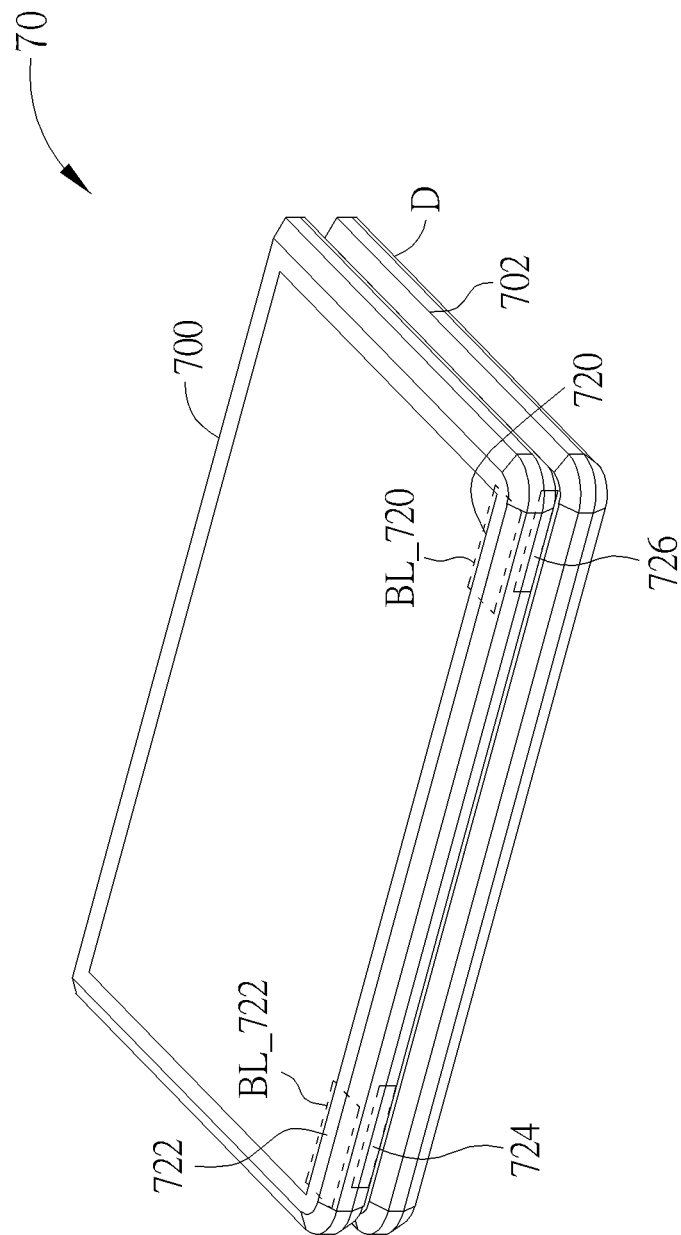

For example, FIGS. 7A and 7B are schematic diagrams of a wireless communication device 70 operating in the notebook mode and the pad mode according to an embodiment of the present invention. An RF system 72 of the wireless communication device 70 is derived from the RF system 12, and comprises antenna radiation elements 720, 722 and metal walls 724, 726. For brevity, FIGS. 7A and 7B omit the antenna grounding elements, show the antenna radiation elements 720, 722 by merely rectangular areas, and denote adjacent lines connecting the antenna radiation elements 720, 722 and the corresponding grounding elements as the radiating element edges BL_720, BL_722. In addition, as shown in FIGS. 7A and 7B, the wireless communication device 70 allows a first board body 700 to rotate in respect to a second board body 702 along a first axis R1 and a second axis R2 via a hinge 704, so as to switch operations to the notebook mode and the pad mode. In such a situation, a location for disposing the metal wall 726 is related to a location for disposing the antenna radiation element 720 on the first board body 700. That is, when the wireless communication device 70 operates in the pad mode, the metal wall 726 has to be substantially close to the radiating element edge BL_720 of the antenna radiation element 720. Similarly, when the wireless communication device 70 operates in the pad mode, the metal wall 724 has to be substantially close to the radiating element edge BL_722 of the antenna radiation element 722. The RF system 72 is an example for the wireless communication device 70 having a bi-axis rotational hinge mechanism. The locations of the metal walls 724, 726 are determined by the locations of the antenna radiation elements 720, 722 in the pad mode. Other modifications may be referred to the above description and not narrated herein.

Figure 8A:
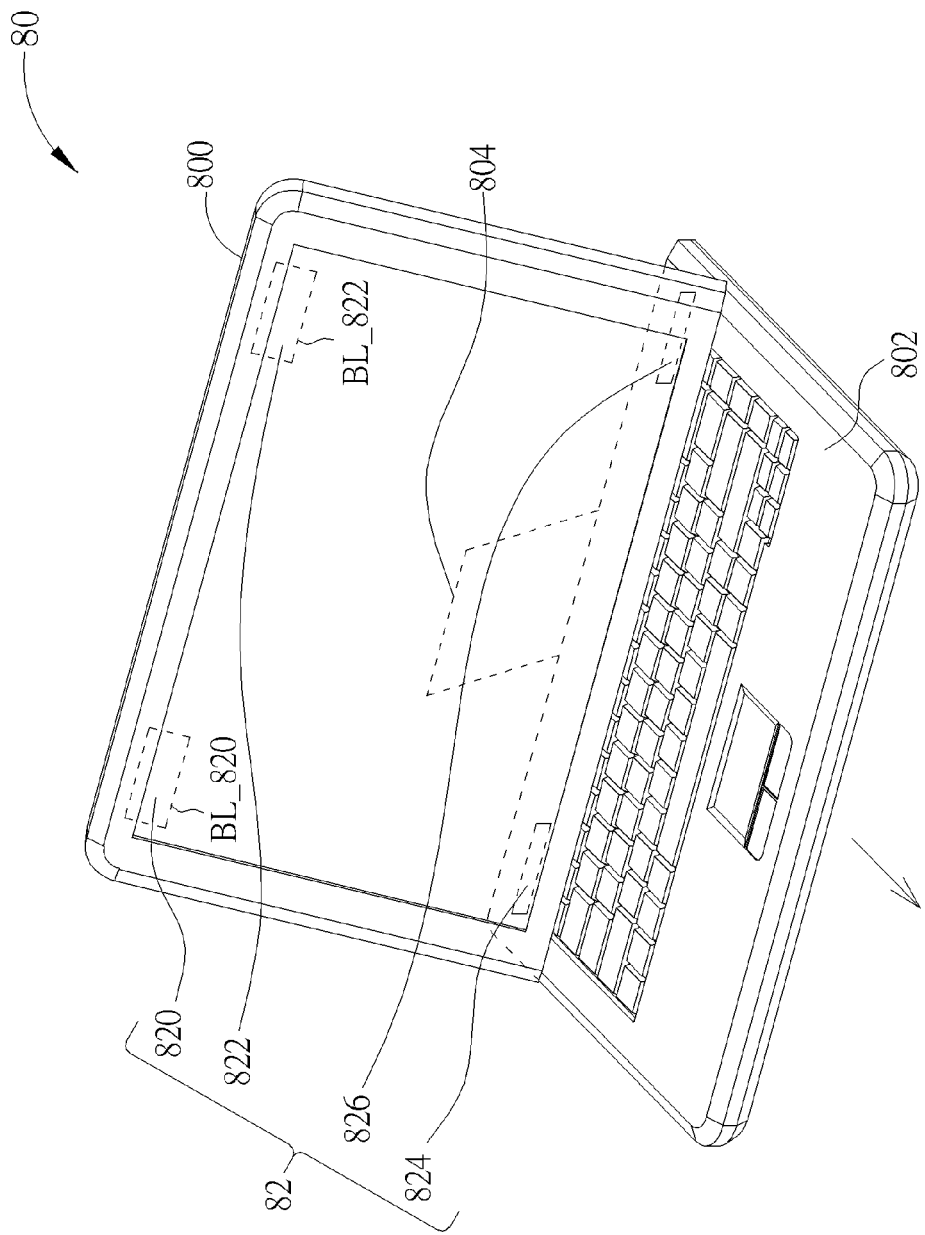
FIGS. 8A, 8B are schematic diagrams of a front view and a sectional side view of a wireless communication device operating in the notebook mode according to an embodiment of the present invention.
Figure 8B:
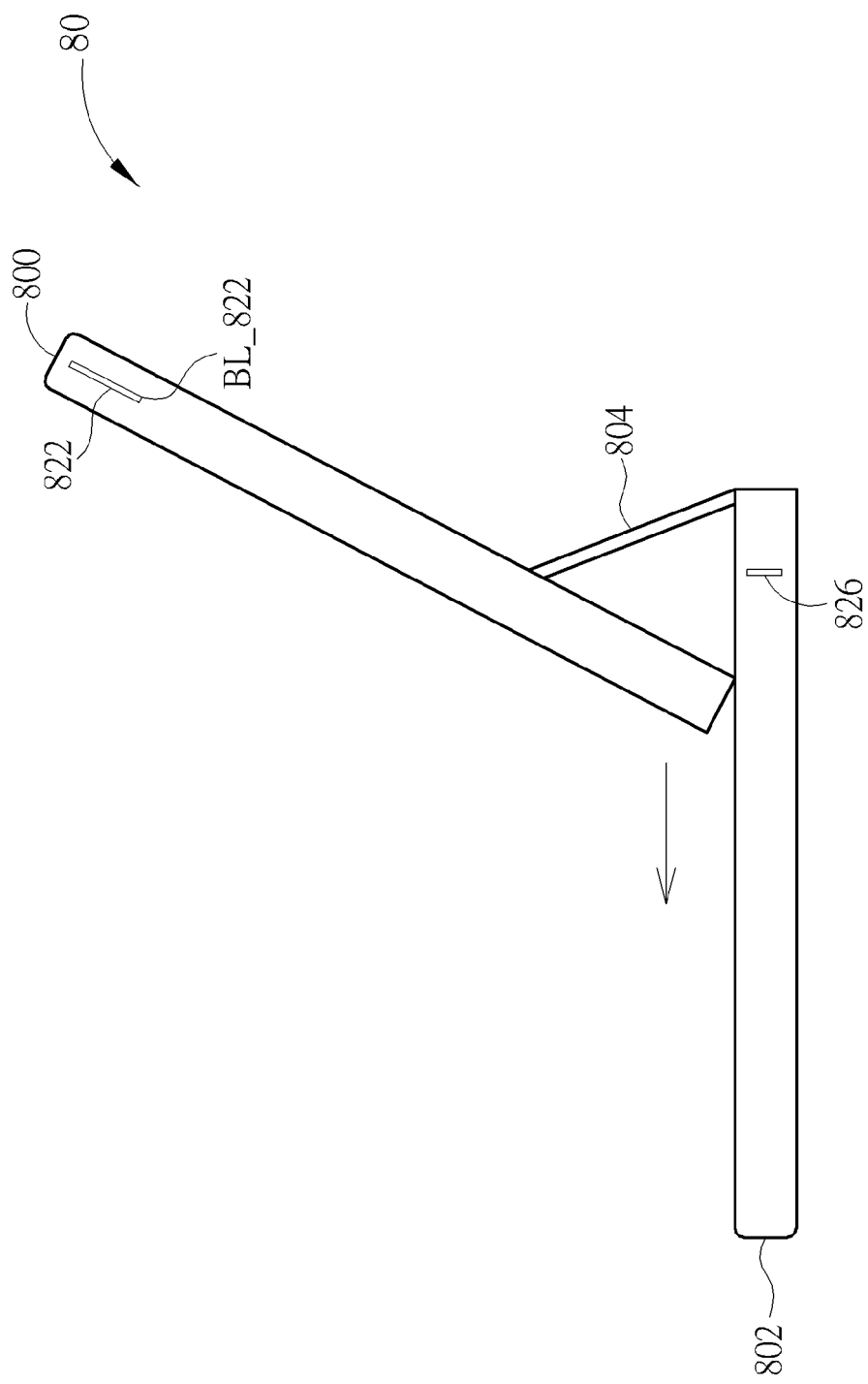
Figure 8C:
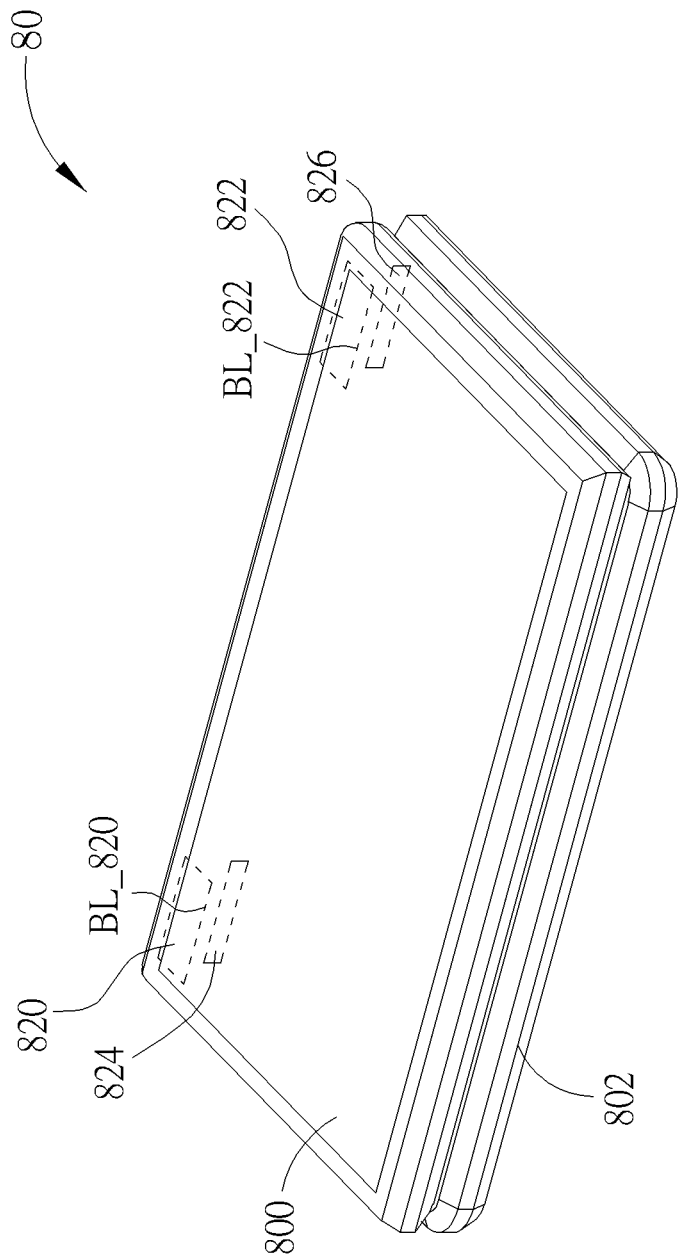
FIGS. 8C, 8D are schematic diagrams of a front view and a sectional side view of the wireless communication device shown in FIGS. 8A, 8B operating in the pad mode according to an embodiment of the present invention.
Figure 8D:
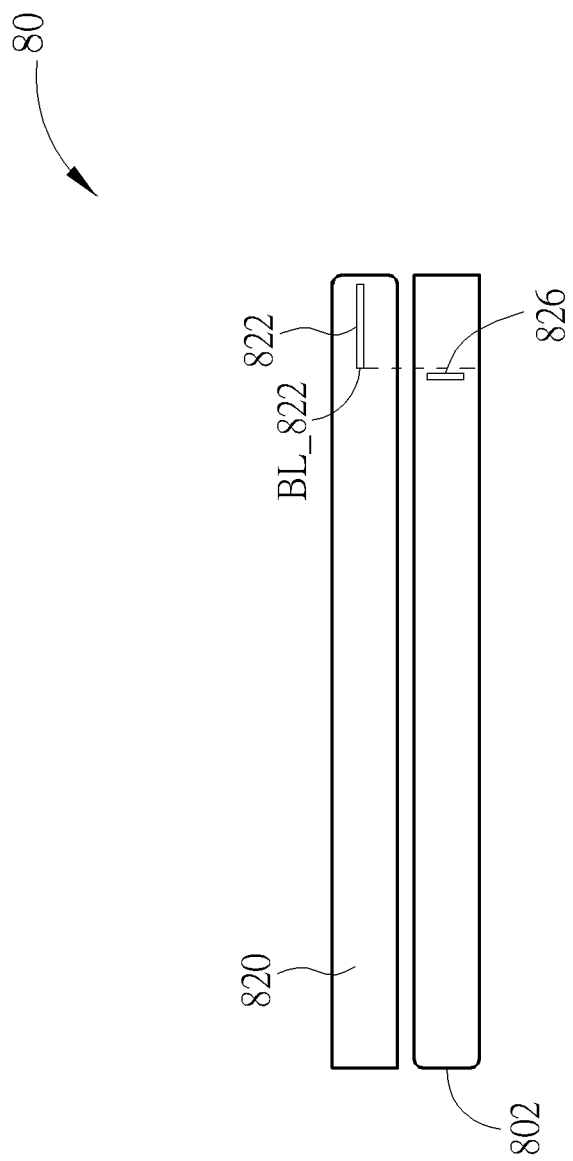

Please refer to FIGS. 8A-8D. FIGS. 8A, 8B are schematic diagrams of a front view and a sectional side view of a wireless communication device 80 operating in the notebook mode. FIGS. 8C, 8D are schematic diagrams of a front view and a sectional side view of the wireless communication device 80 operating in the pad mode. An RF system 82 of the wireless communication device 80 is derived from the RF system 12, and comprises antenna radiation elements 820, 822 and metal walls 824, 826. For brevity, FIGS. 8A-8B omit the antenna grounding elements, show the antenna radiation elements 820, 822 by merely rectangular areas, and denote adjacent lines connecting the antenna radiation elements 820, 822 and the corresponding grounding elements as the radiating element edges BL_820, BL_822. In addition, as shown in FIGS. 8A-8D, the wireless communication device 80 allows a first board body 800 sliding corresponding to a second board body 802 via a supporting portion 804, so as to switch operations to the notebook mode and the pad mode. In such a situation, locations for disposing the metal walls 824, 826 are related to locations of the antenna radiation elements 820, 822 on the first board body 800 after sliding. That is, when the wireless communication device 80 operates in the pad mode, the metal walls 824, 826 have to be substantially close to the radiating element edges BL_820, BL_822 of the antenna radiation elements 820, 822. The RF system 82 illustrates how to determine the locations of the metal walls 824, 826 for the wireless communication device 80 switching the operation modes via sliding, and other modifications may be referred to the above description and not narrated herein.

Figure 9A:
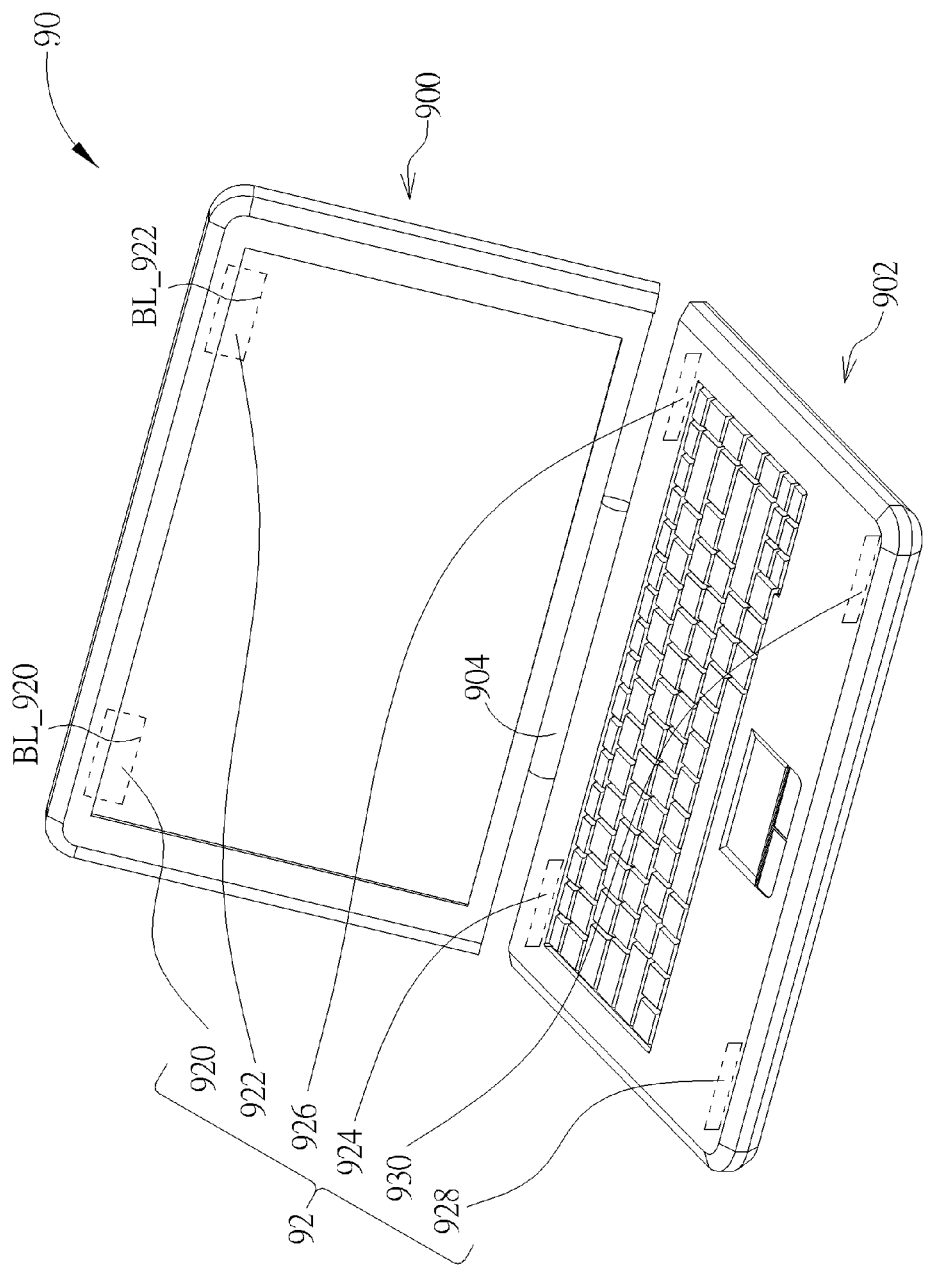
FIGS. 9A, 9B are schematic diagrams of a front view and a sectional side view of a wireless communication device operating in the notebook mode according to an embodiment of the present invention.
Figure 9B:
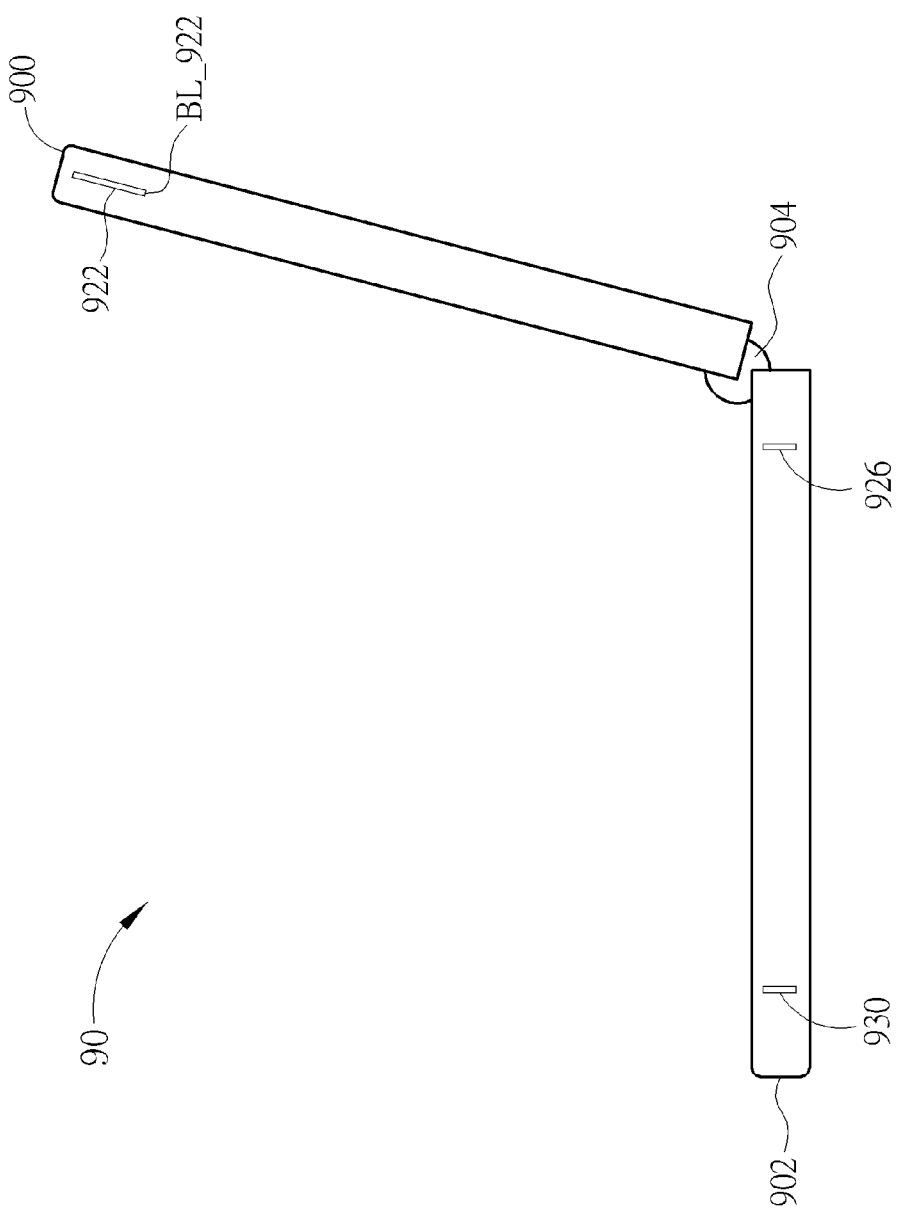
Figure 9C:
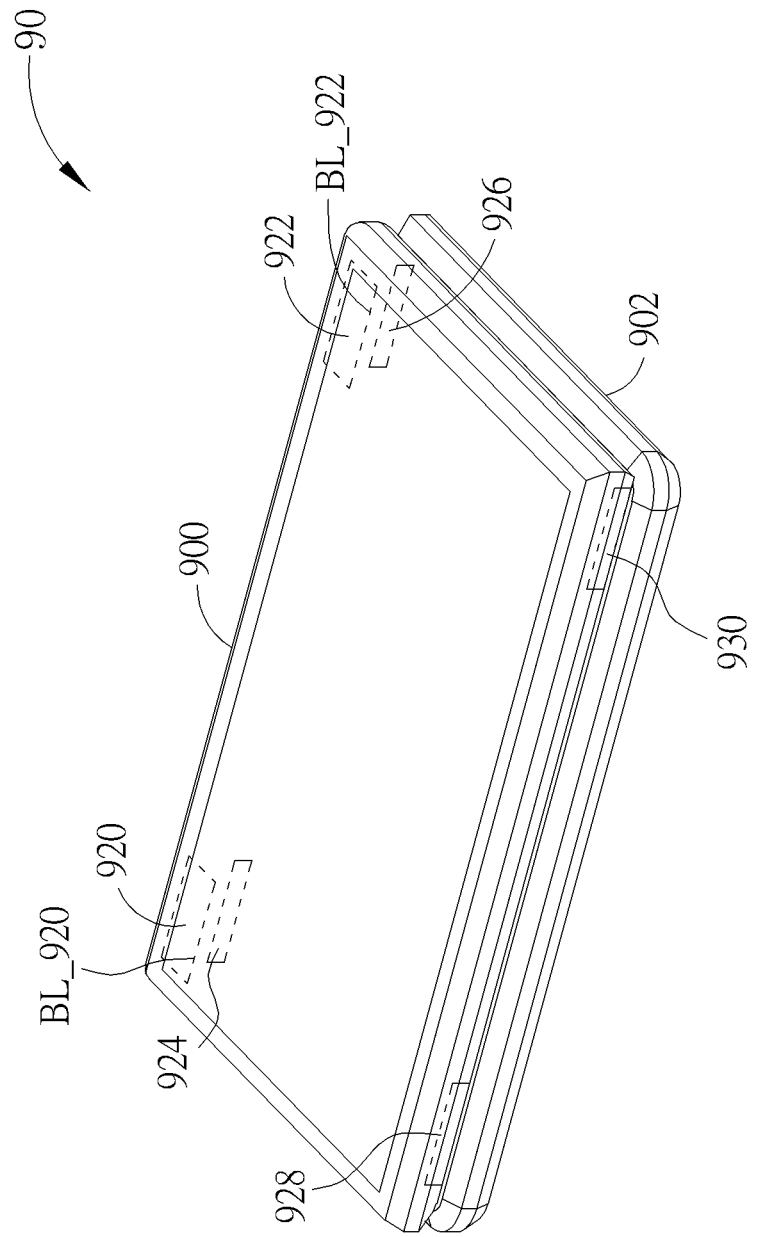
FIGS. 9C, 9D are schematic diagrams of a front view and a sectional side view of the wireless communication device shown in FIGS. 9A, 9B operating in a first pad mode.
Figure 9D:
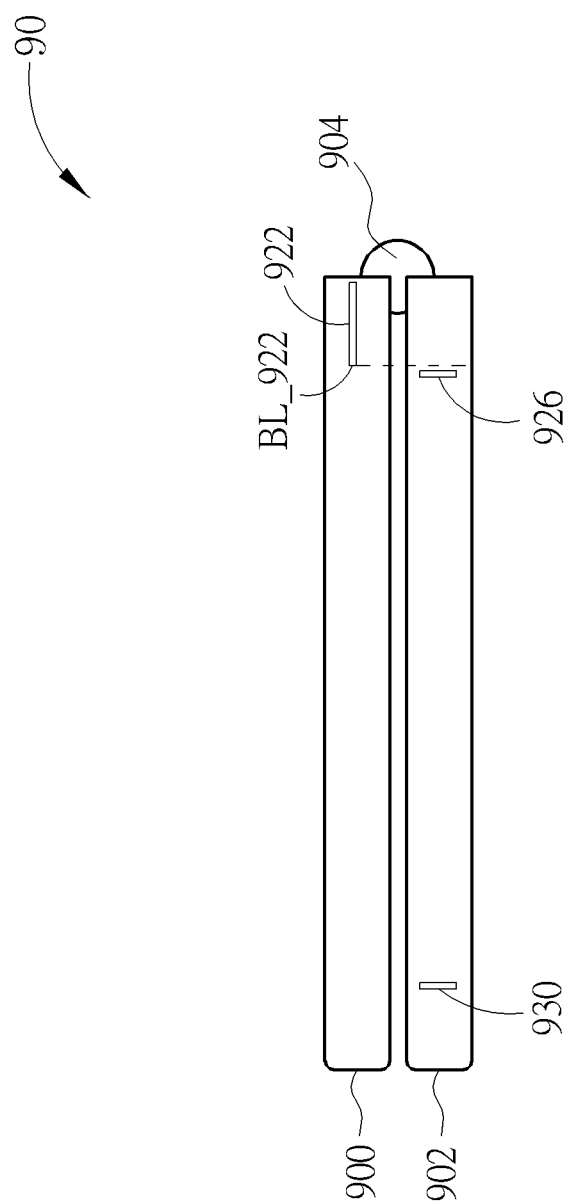
Figure 9E:
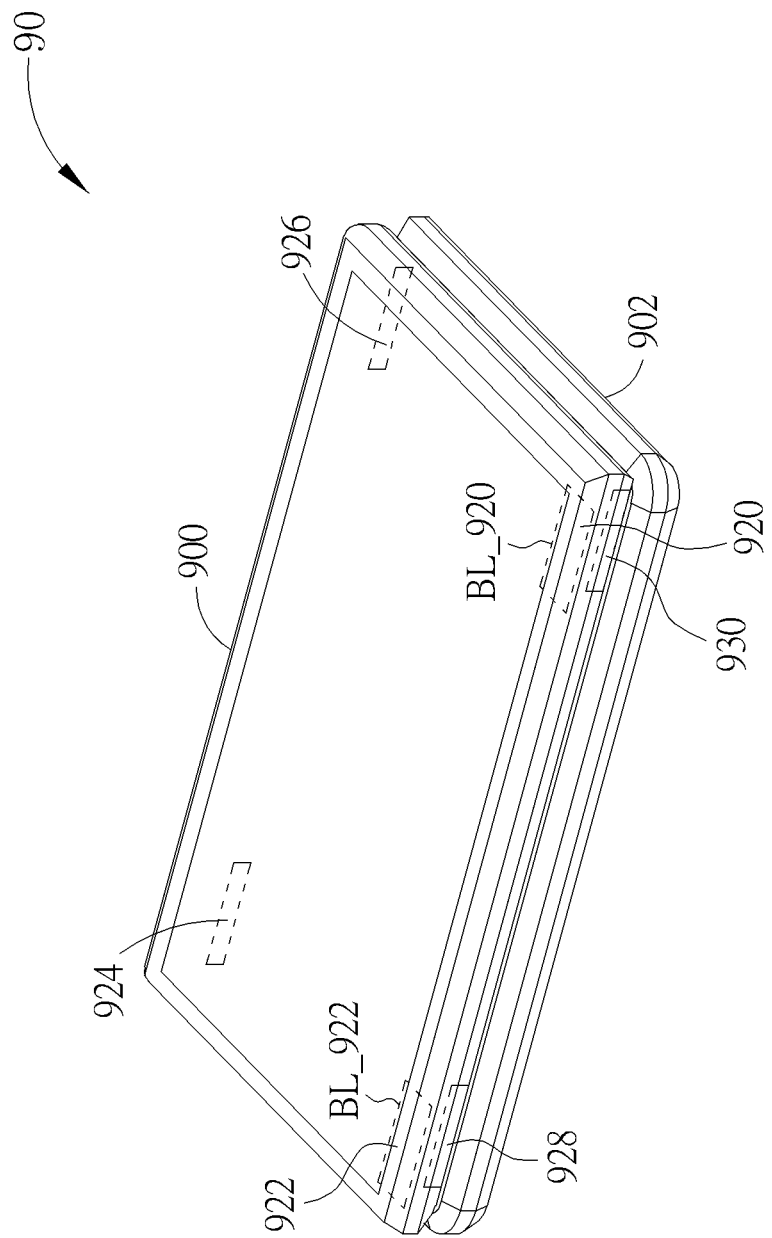
FIGS. 9E, 9F are schematic diagrams of a front view and a sectional side view of the wireless communication device shown in FIGS. 9A, 9B operating in a second pad mode.
Figure 9F:
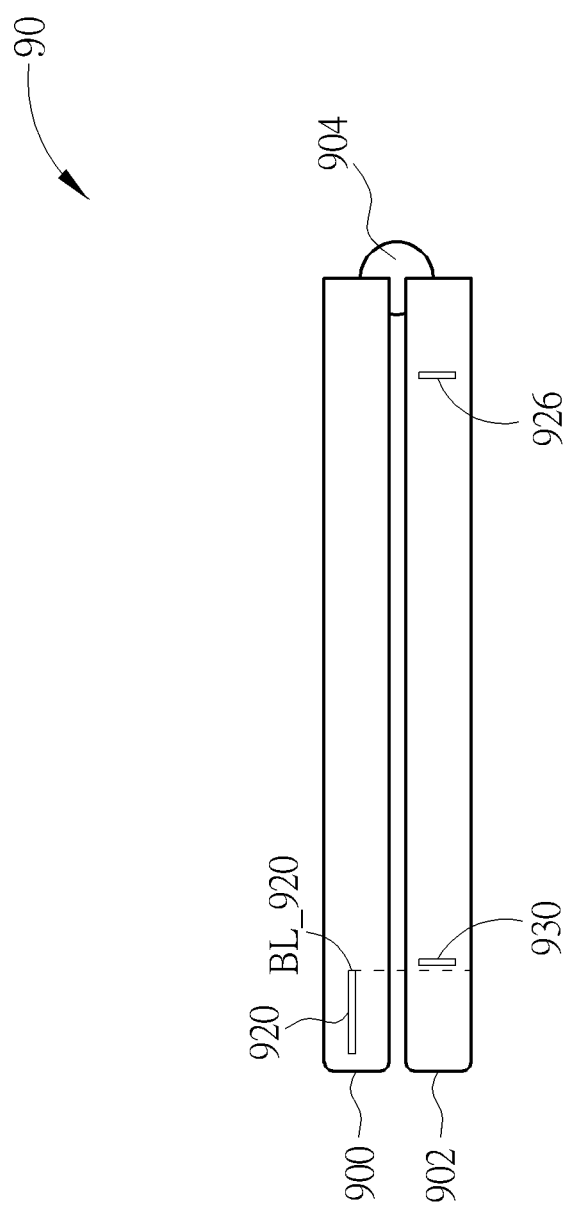

Please refer to FIGS. 9A-9F. FIGS. 9A, 9B are schematic diagrams of a front view and a sectional side view of a wireless communication device 90 operating in the notebook mode. FIGS. 9C, 9D are schematic diagrams of a front view and a sectional side view of the wireless communication device 90 operating in a first pad mode. FIGS. 9E, 9F are schematic diagrams of a front view and a sectional side view of the wireless communication device 90 operating in a second pad mode. An RF system 92 of the wireless communication device 90 is derived from the RF system 12, and comprises the antenna radiation elements 920, 922 and the metal walls 924, 926, 928, 930. For brevity, FIGS. 9A-9F omit the antenna grounding elements, show the antenna radiation elements 920, 922 by merely rectangular areas, and denote adjacent lines connecting the antenna radiation elements 920, 922 and the corresponding grounding elements as the radiating element edges BL_920, BL_922. As shown in FIGS. 9A-9F, the wireless communication device 90 uses a connecting portion 904 to allow a first board body 900 being either fixed on a second board body 902 or removed from the second board body 902, so as to switch operations from the notebook mode to the first pad mode and the second pad mode. That is, when the first board body 900 is apart from the second board body 902, the first board body 900 may attach to the second board body 902 to operate in the first pad mode, or rotate in 180 degrees and then attach to the second board body 902 to operate in the second pad mode. In such a situation, locations for disposing the metal walls 924, 930 are related to locations of the antenna radiation element 920 in the first pad mode and in the second pad mode; locations for disposing the metal walls 926, 928 are related to locations of the antenna radiation element 922 in the first pad mode and in the second pad mode. The RF system 92 illustrates how to design and determine the locations of the metal walls 924-930 for the wireless communication device 90 having two pad modes, and other modifications may be referred to the above description and not narrated herein.

FIGS. 7A-9F illustrates that by adjusting the locations of the metal walls, the present invention may be applied to different wireless communication devices, but not limited thereto. The present invention may be applied to other wireless communication devices capable of switching operations to the notebook mode and the pad mode, as long as the metal wall has a predefined height in comparison to the bottom of the antenna in the pad mode. In addition, other board body factors such as materials, shapes, components embedded of the first board body and the second board body, other antenna factors such as shapes, sizes, and numbers of antennas, or other metal wall factors such as shapes and numbers of metal wall may be modified according to system requirements.

In the prior art, when the wireless communication device capable of switching operations to either the notebook mode or the pad mode operates in the pad mode, the antenna performance would be affected by the base since the back plane of the monitor is attached to the base. In comparison, the metal wall of the present invention is substantially close to the edge of the radiation element of the antenna, and has a predefined height compared to the disposed plane of the antenna, so as to avoid radiation energy of antenna emitting toward the interior, preventing radiation efficiency from being interfered. Therefore, when the wireless communication device operates in the pad mode, the RF system of the present invention maintains normal wireless communication functions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio-frequency (RF) system for a wireless communication device, wherein the wireless communication device comprises a first board body and a second board body, and is capable of switching operations to a pad mode, in which an angle between the first broad body and the second broad body is less than a predefined value, or at least a non-pad mode, in which the angle is greater than the predefined value, the RF system comprising:
   at least an antenna, disposed in the first board body and substantially extending along a first plane of the first board body, each of the antennas comprising a radiating element and a grounding element adjacent to the radiating element; and
   at least a metal wall, electrically connected to a system ground of the wireless communication device, disposed in locations of the second board body related to locations of the at least an antenna disposed in the first board body, and substantially extending along a second plane of the second board body;
   wherein when the wireless communication device operates in the pad mode, the second plane is substantially perpendicular to the first plane, such that each of the metal walls has a height corresponding to the first plane;
   wherein when the wireless communication device operates in the pad mode, a projection result of each of the metal walls corresponding to the first plane is substantially adjacent to the radiating element of one of the at least an antenna.

2. The RF system of claim 1, wherein the wireless communication system is a computer system, the first board body comprises a monitor of the computer system, and the pad mode represents that a back of the first board body opposite to a displaying direction of the monitor lies on the second board body.

3. The RF system of claim 1, wherein the projecting result is substantially parallel to an edge of an area for disposing the radiating element.

4. The RF system of claim 3, wherein a length of the projection result is greater than or equal to a length of the edge of the area for disposing the radiating element.

5. The RF system of claim 1, wherein the height is greater than or equal to 1 millimeter.

6. The RF system of claim 1, wherein the height is not fixed.

7. The RF system of claim 1, wherein the projection result of each metal wall corresponding to the first plane substantially overlaps with the grounding element of the antenna.

* * * * *